March 8, 1966 W. C. LEONE ETAL 3,238,615
MACHINE TOOL
Original Filed Sept. 5, 1961 13 Sheets-Sheet 6

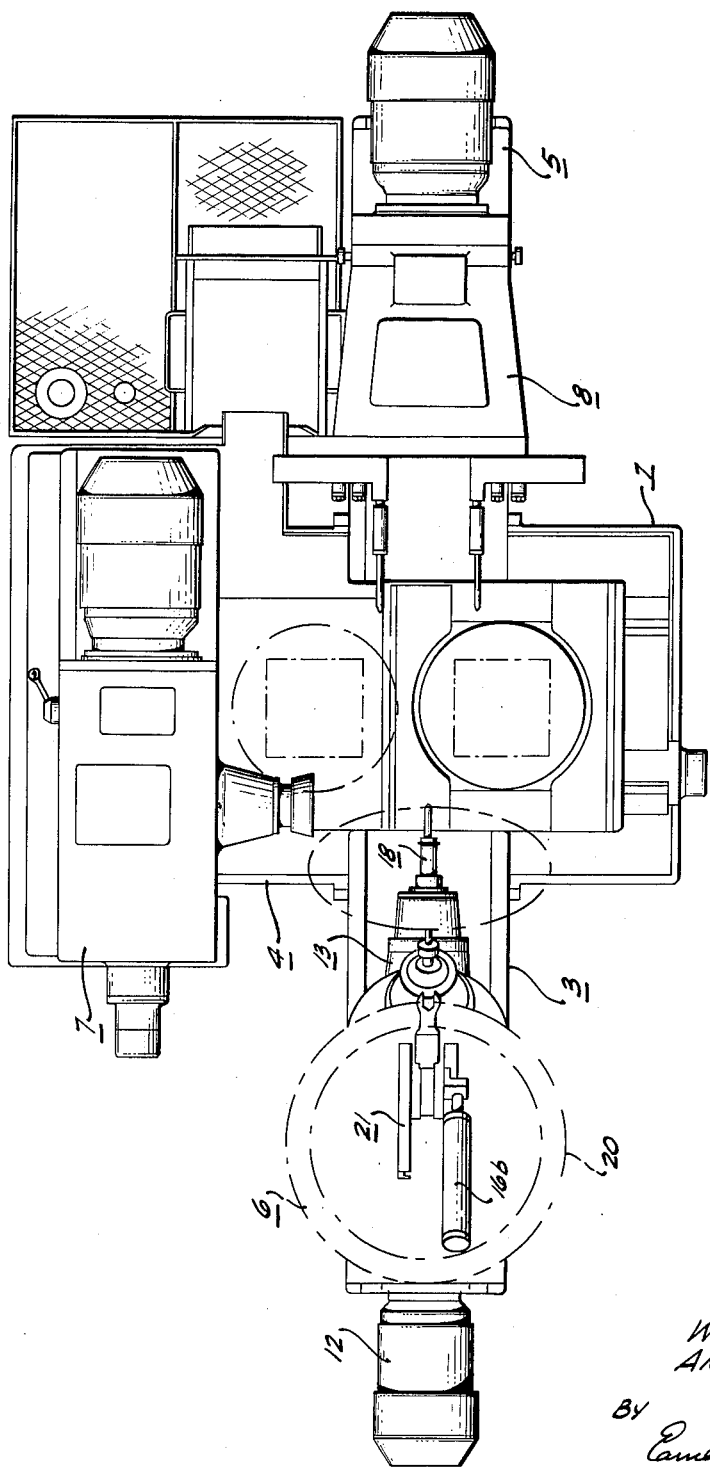

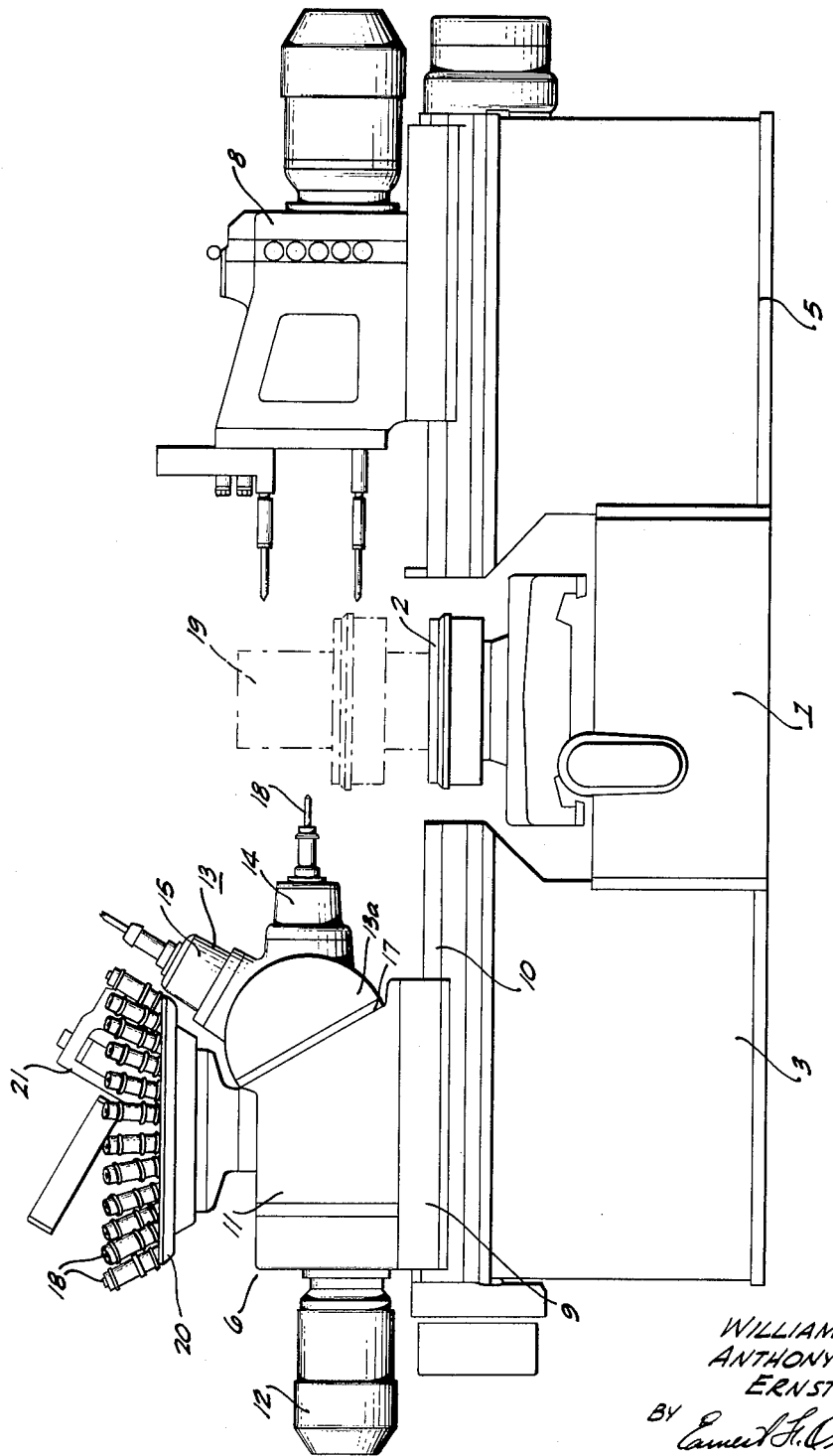

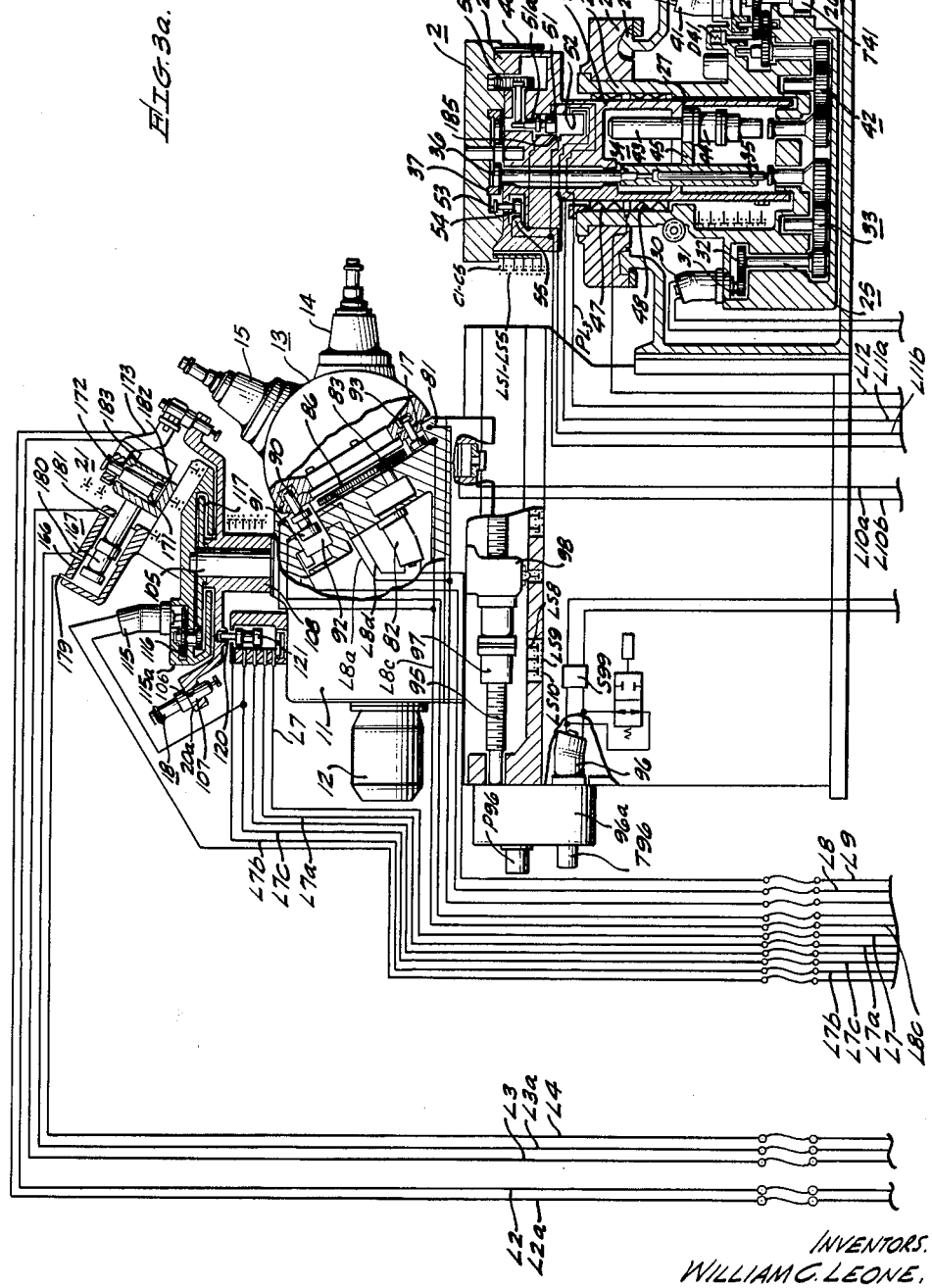

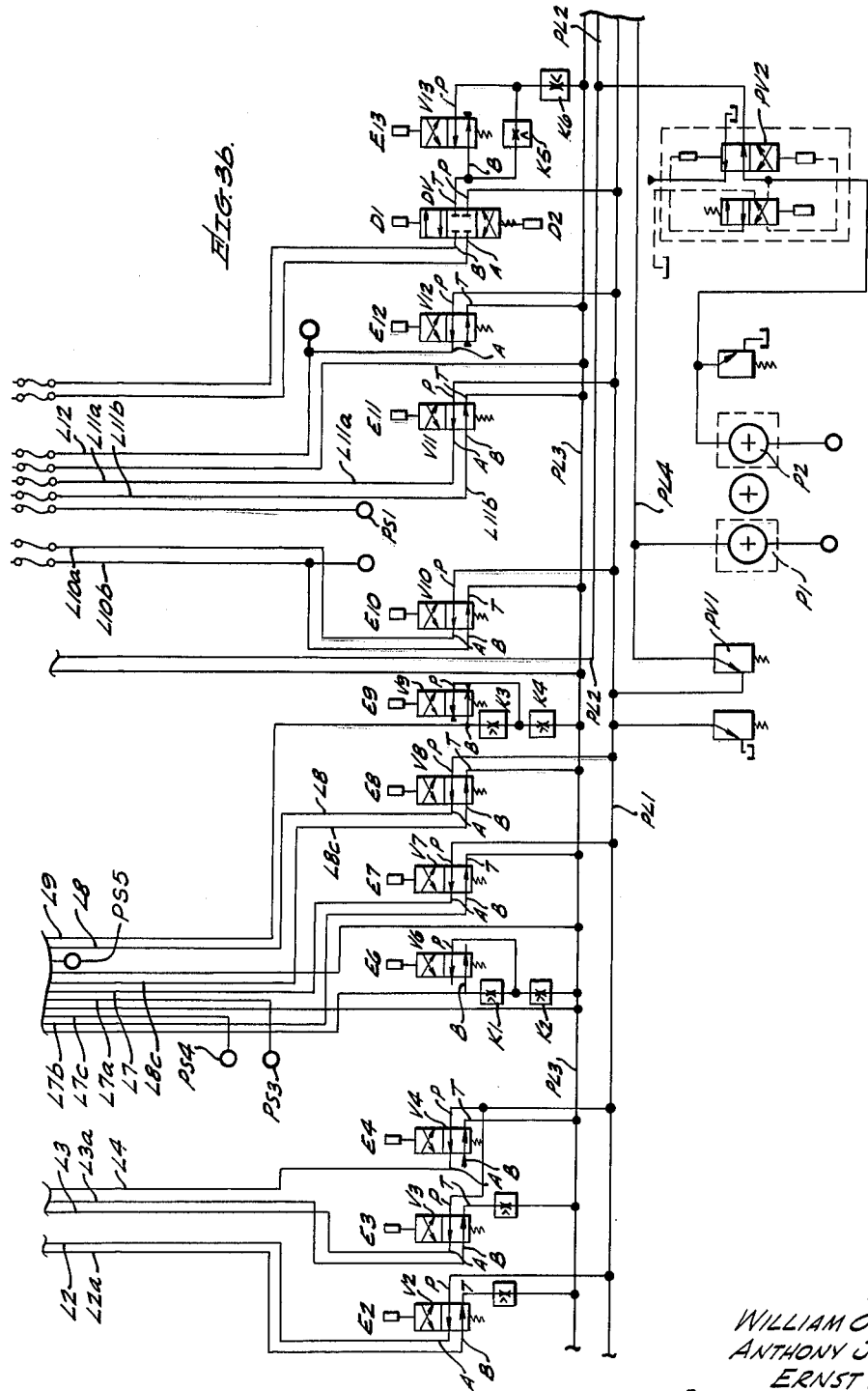

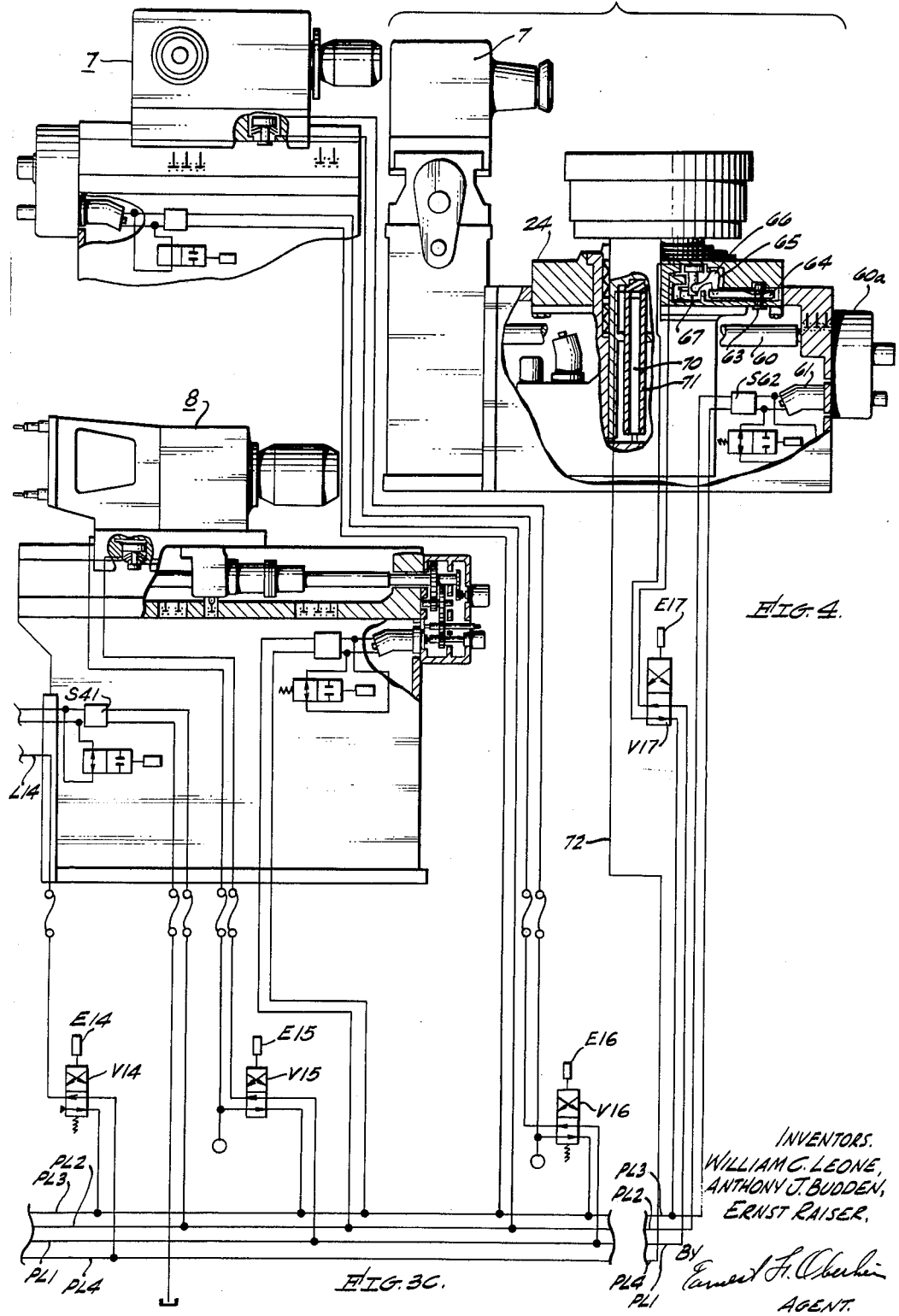

INVENTORS.
WILLIAM C. LEONE,
ANTHONY J. BUDDEN,
ERNST RAISER,
BY Ernest F. Oberheim
AGENT.

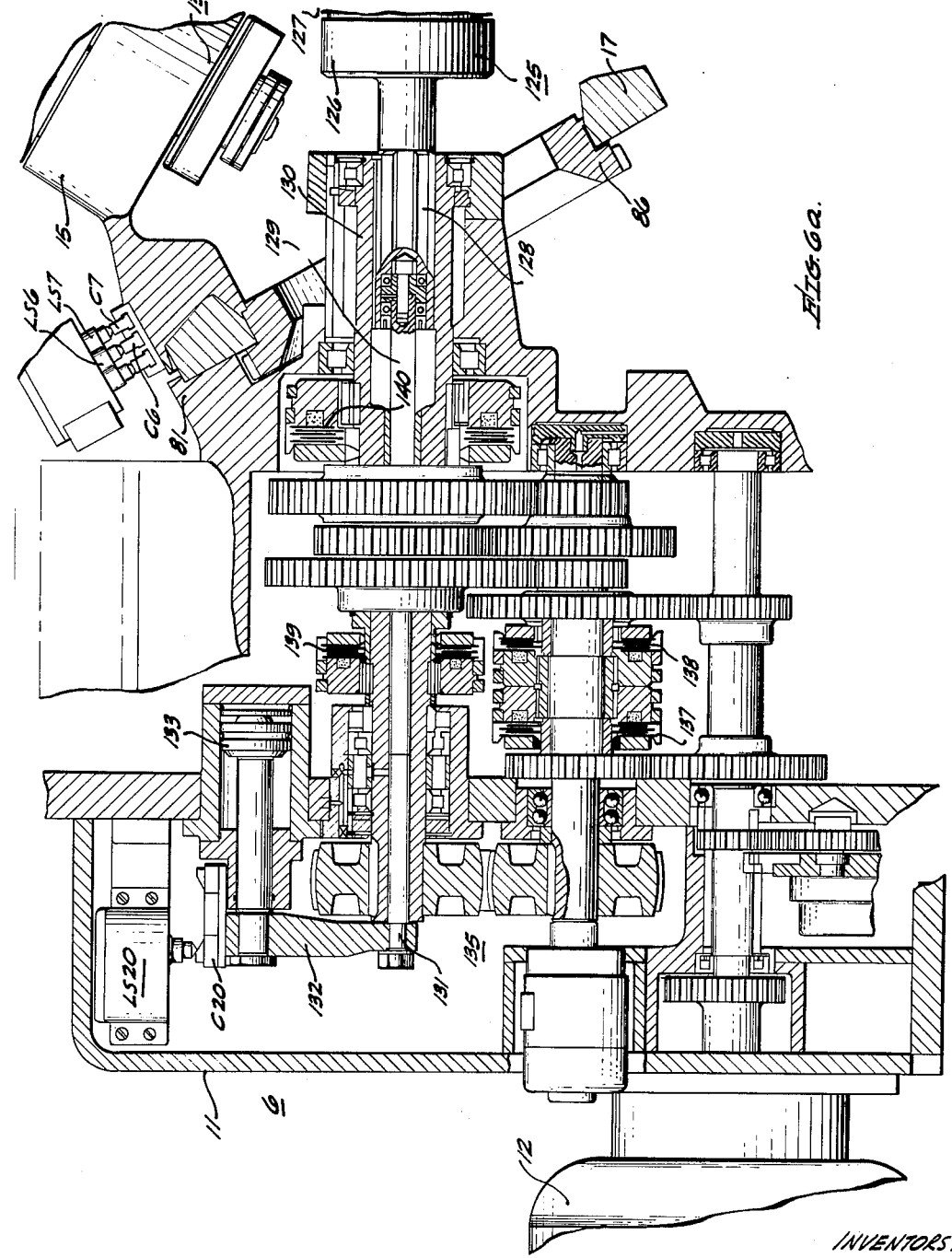

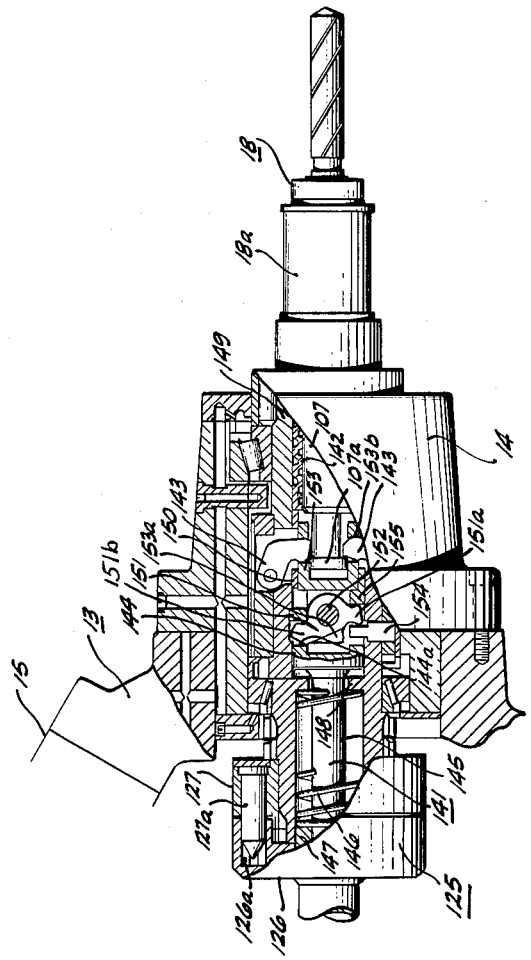

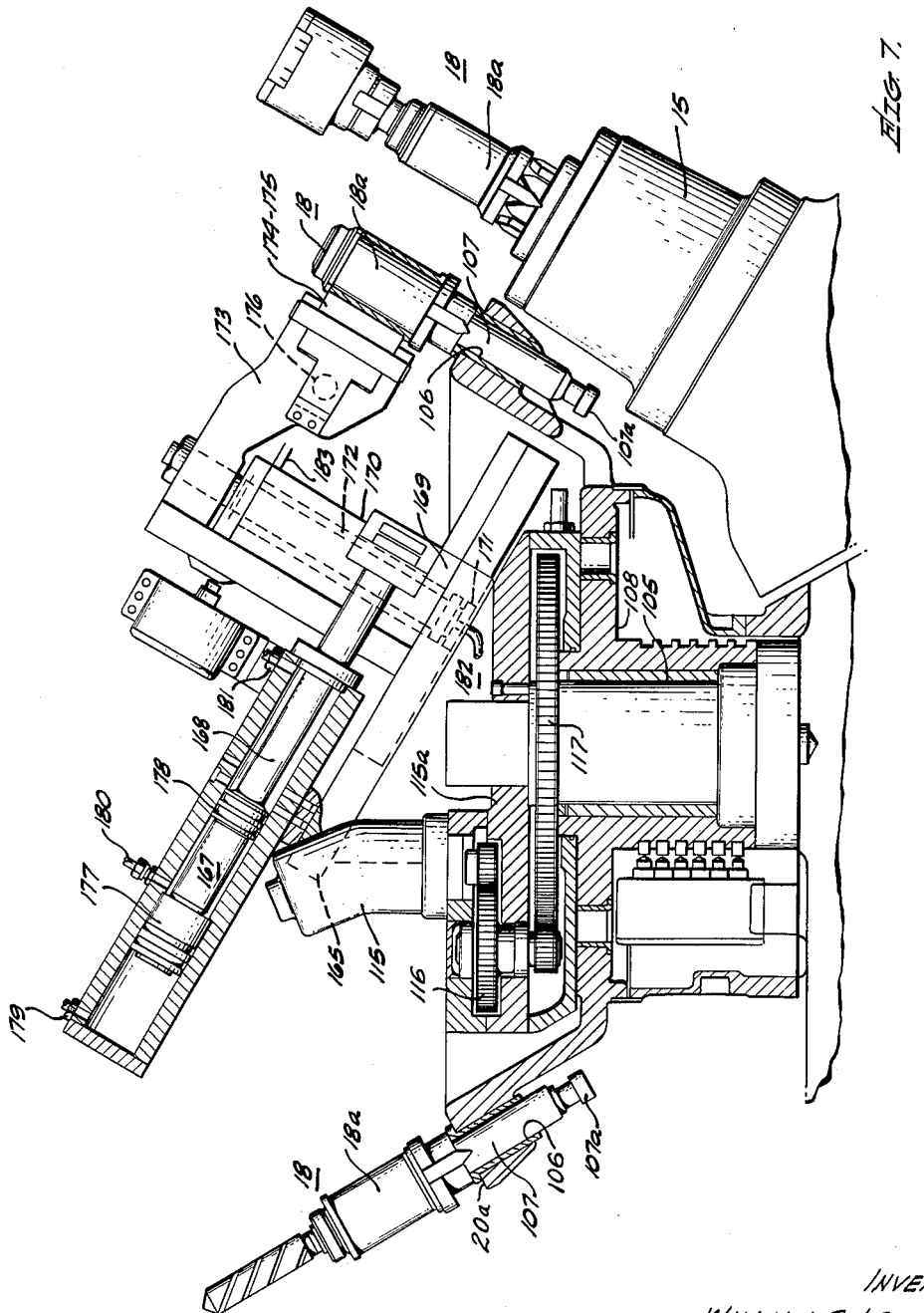

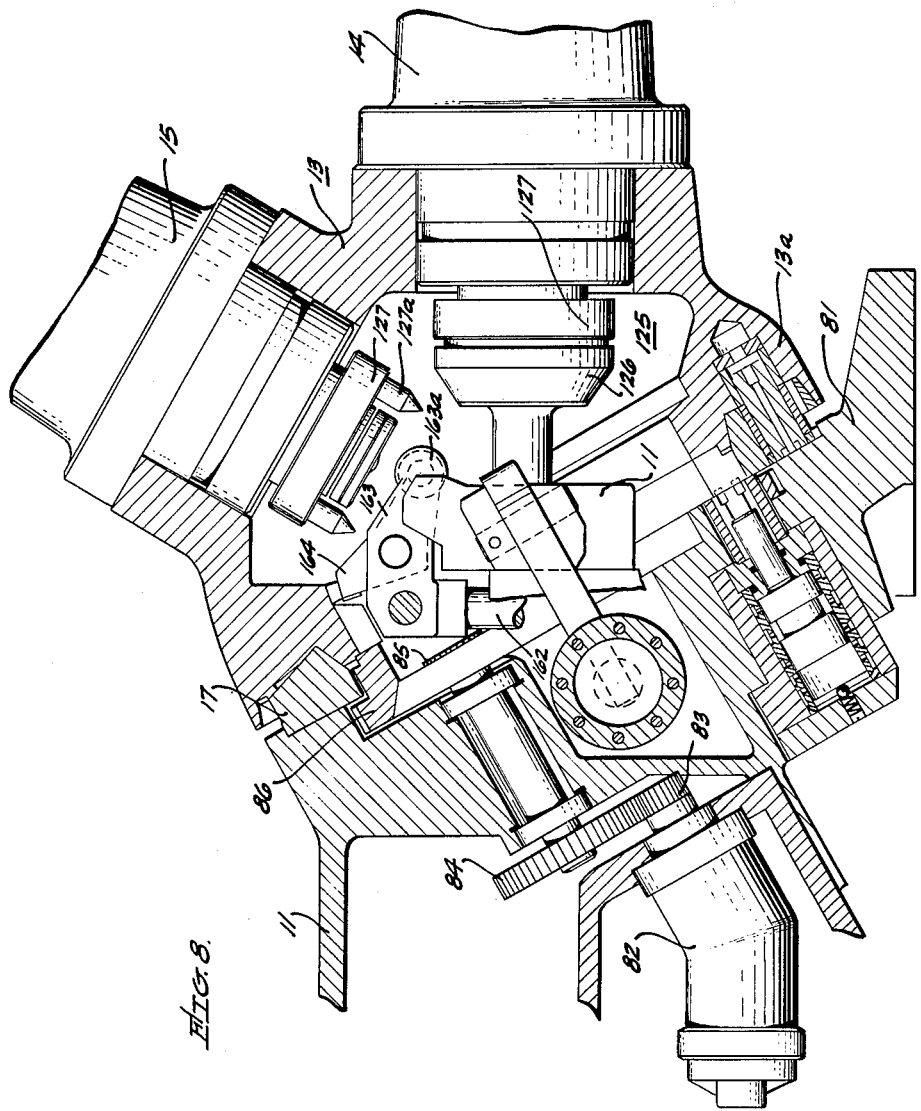

March 8, 1966    W. C. LEONE ETAL    3,238,615
MACHINE TOOL
Original Filed Sept. 5, 1961    13 Sheets-Sheet 11
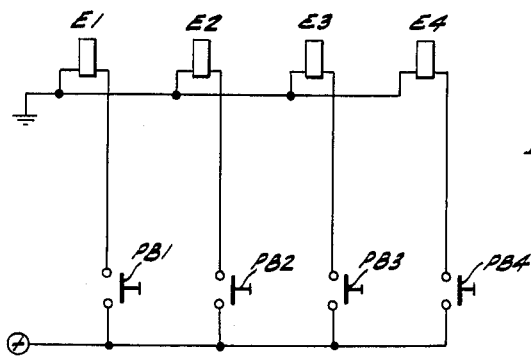
FIG. 9.
FIG. 13.
FIG. 12.
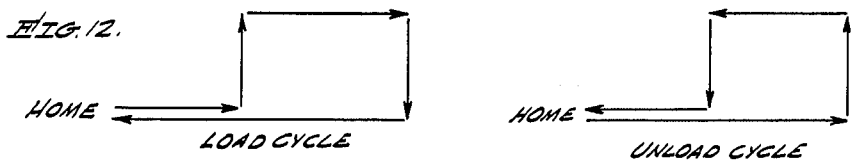
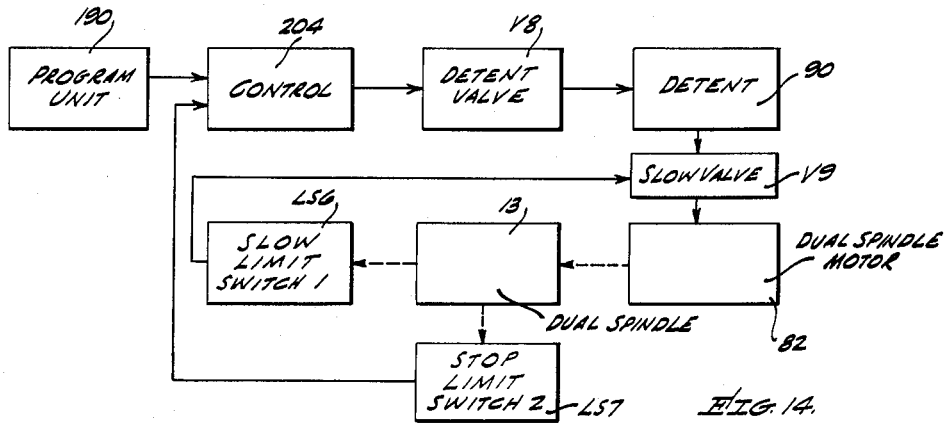
FIG. 14.
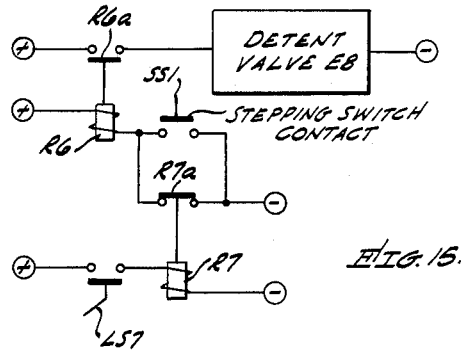
FIG. 15.
INVENTORS.
WILLIAM C. LEONE,
ANTHONY J. BUDDEN,
ERNST RAISER,
BY Ernest F. Oberhein
AGENT.

March 8, 1966  W. C. LEONE ETAL  3,238,615
MACHINE TOOL

Original Filed Sept. 5, 1961  13 Sheets-Sheet 12

INVENTORS.
WILLIAM C. LEONE,
ANTHONY J. BUDDEN,
ERNST RAISER,
BY
AGENT.

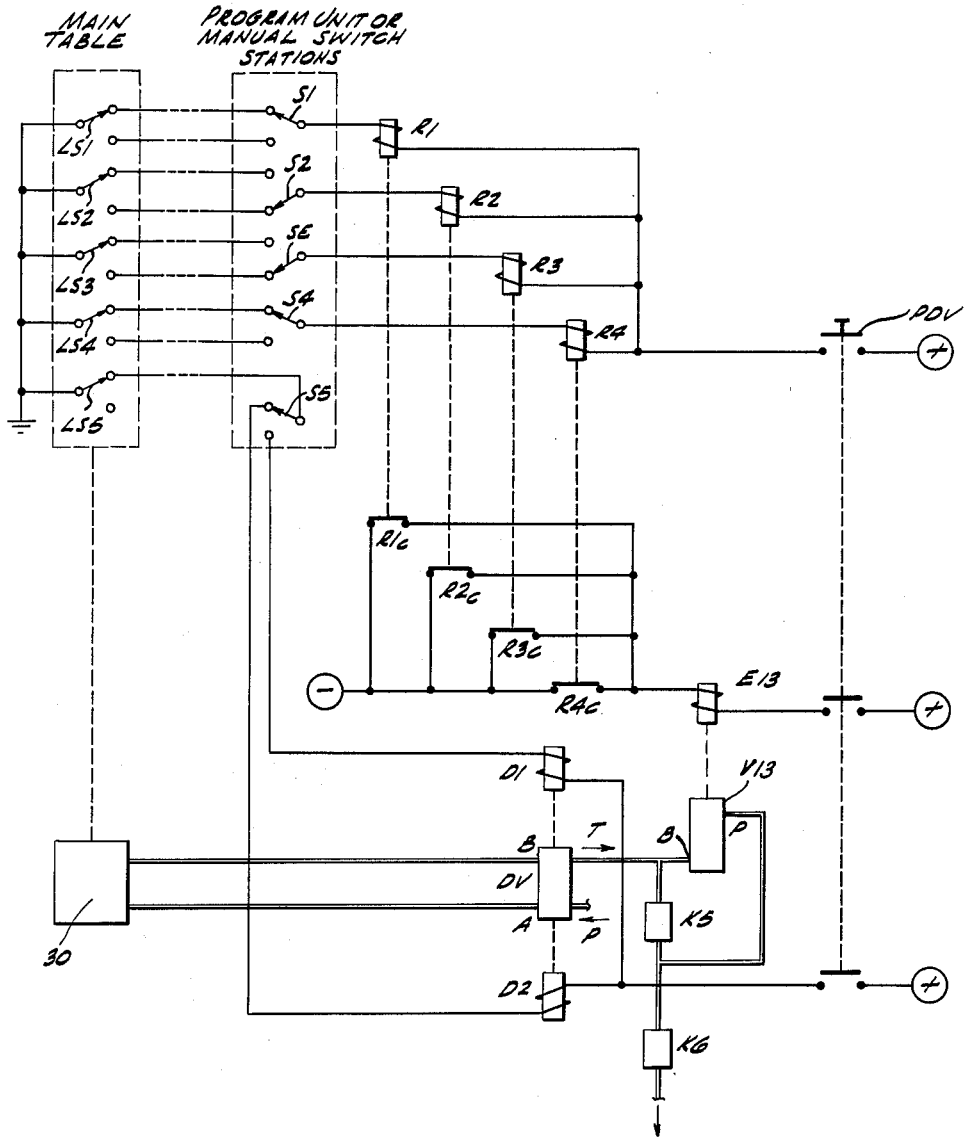

United States Patent Office 3,238,615
Patented Mar. 8, 1966

3,238,615
MACHINE TOOL
William C. Leone, Palos Verdes Estates, Calif., Anthony J. Budden, London, England, and Ernst Raiser, Reutlingen-Rommesbach, Germany, assignors, by direct and mesne assignments, to Hughes Aircraft Company, Culver City, Calif., a corporation of Delaware
Continuation of abandoned application Ser. No. 135,936, Sept. 5, 1961. This application June 2, 1964, Ser. No. 431,748
20 Claims. (Cl. 29—568)

This application is a continuation of our copending application, Serial No. 135,936, filed September 5, 1961, and now abandoned.

This invention relates generally to machine tools, and more particularly to an automatic machine tool having facilities affording a high degree of flexibility in the choice of machining operations, coupled with minimum time requirements in changing from one type of machining operation to another.

Several types of machine tools in this general category are available. For the purposes of this discussion those of particular concern are of the numerically controlled types in which instructions for performing a particular machine operation are contained in discrete form on a suitable type of record member, such as a tape or a card.

According to one type of numerically controlled systems, an arrangement of tools is provided in a suitable organization under the control of a perforated tape whereby all of the machine operations to be performed on a particular part or workpiece are completed as the part is moved through the machine system. This arrangement comprises a line of several machines, for example, mill, drill and bore. All of the instructions for machining a particular part at each machine tool are programmed on a single tape. The tape is switched into the electronic controls for the first machine tool in the line as the part is moved into the first machine tool work station. The tape is read and all of the milling operations are performed. Thereafter, the part is transferred to the work station of the drilling machine, along with the tape. All of the drilling instructions are read from the tape and at the completion of the drilling operations the part is transferred to the work station of the boring machine and all of the boring instructions are read from the tape. When the boring operations are completed the part is transferred from the line. If multiple identical parts are to be worked, several such tapes and tape readers may be switched in sequence among the tools with the parts thereby providing for three parts to be operated upon in the line simultaneously, one at each of the three stations.

This represents a relatively expensive concept. However, it does provide a machine tool system which permits rapid machining of identical parts, or which, by using differing tapes, permits intermixing of differing parts. Hence, where large volume production is contemplated this type of machine tool system offers marked advantages.

In another type of arrangement the mechanics of the system are simplified and, hence, the cost of the machine tool is reduced. In this arrangement a single machine tool is provided which has a tool magazine which permits interchanging selected tools with the machine tools so that multiple machining operations of differing character may be performed upon a workpiece at a single work station. Facilities for interchanging tools with the machine tool may include an indexable drum carrying tool spindle assemblies movable into operative position with respect to the drive system of the machine. Such an arrangement is described in Patent No. 2,859,644. An arrangement of this type is usually limited to the use of tools which require no adjustment during a machining operation. For instance, boring tools in such an arrangement would be preset and no radial adjustments would be made during the course of a machining operation.

In another type of arrangement affording approximately the same degree of flexibility, a single spindle machine tool is equipped with an indexable tool magazine carrying a plurality of differing types of cutting tools. With this arrangement a tool changer is provided which transfers tools between the tool magazine and the tool spindle under some sort of a predetermined program.

Each of the two latter types of tools equipped with tool magazines requires a certain "down time" or inactive time during which a tool change is being made. Normally, this requires retraction of the tool and/or tool carriage to some position which might be referred to as "home position" or tool changing position, in which position tool exchange takes place. Where the time involved in particular machine operations on a part is short and the number of differing types of machining operations is high, the tool exchanging interval can represent a significant portion or perhaps a major portion of the overall time required to perform the desired machine operations on the particular part or workpiece.

One object of this invention is to provide a machine tool which affords a high degree of flexibility in the choice of machining operations.

Another object of this invention is to provide a machine tool having facilities for automatically changing cutting tools in a tool spindle to permit differing types of machining operations.

A further object of this invention is to provide a machine tool having a tool changing facility in which the inactive period with respect to machining operations due to tool changing is at a minimum.

The aforesaid and other objects and advantages are accomplished, according to the present invention, in a machine tool arrangement providing a dual spindle assembly having a pair of spindles disposed at an angle to one another and mounted for rotation upon a support, such as a tool carriage, about an axis approximately bisecting the angle between the dual spindles. Spindle power means is provided upon the tool carriage including a drive system and a suitable separable coupling. Spindle interchange is achieved by uncoupling a tool spindle from the drive system, rotating the spindle assembly about the spindle assembly axis and thereafter engaging the second spindle with the drive means.

The support or tool carriage is further provided with a tool magazine which is rotatably mounted thereon and which is provided with circumferentially spaced tool receiving means or slots receiving the identical shanks of a plurality of differing types of cutting tools. Provision is made to rotate and index the tool magazine to bring selected tools into a tool exchanging or tool loading and unloading position adjacent the inactive tool spindle, that is, the tool spindle in tool exchanging position. A tool changer mounted on the tool carriage operates in a cycle from a retracted position to grasp a selected tool in the tool magazine, remove it from the tool magazine and install it in the tool spindle in tool exchanging position. Thereafter, the tool changer returns to retracted position.

The expedient of providing a dual spindle assembly mounted upon a suitable support, such as a tool carriage, together with a tool magazine carried by the tool carriage and selectively indexed to predetermined angular positions for the purpose of selecting tools, provides a tool changing facility which minimizes the inactive time of the machine tool for the purpose of changing tools. By this expedient it is only necessary to retract the tool carriage a distance sufficient to clear the old cutting tool or the new cutting tool, whichever is the longer with respect to the workpiece, and to thereafter rotate the dual spindle assembly to bring the new tool into active position for performing the new machining operation. While the new machining operation is proceeding, the used tool may be unloaded from the inactive spindle, now in tool exchanging position, and returned to the tool magazine, after which, if necessary, the magazine may be indexed to properly select a new tool and the new tool installed in the inactive tool spindle. In one practical embodiment of this invention the interval of time in switching tools is less than three seconds. This is accounted for since it is only necessary to effect rotation of the dual spindle assembly to effect a change.

Other objects and advantages will become apparent from a study of the following specification when considered in conjunction with the accompanying drawings in which:

FIG. 1 is a plan view of a machine tool assembly involving the principles of this invention;

FIG. 2 is an elevational view of the machine tool assembly illustrated in FIG. 1 with one of the machine tools removed in the interest of drawing convenience;

Figure 5:
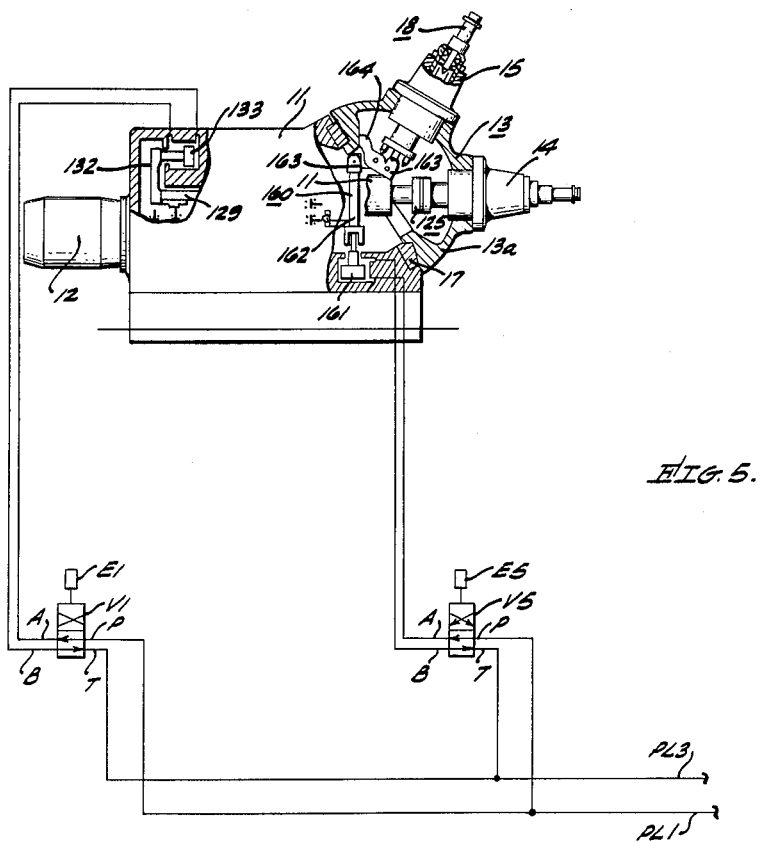
Figure 10:
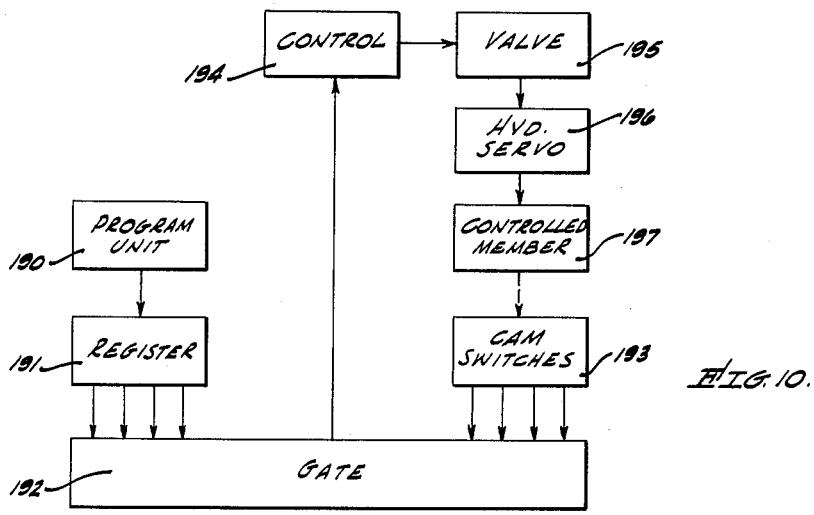
Figure 11:
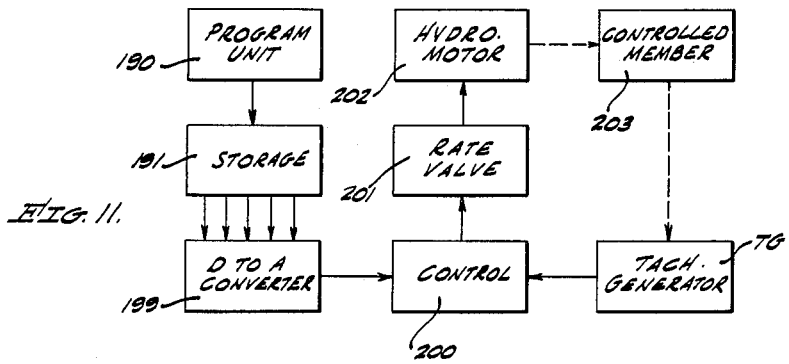

FIGS. 3a, 3b and 3c together schematically illustrate a machine tool system embodying the principles of this invention;

FIG. 4 is a side elevational view of the workpiece table showing some additional features of the control for the table;

FIG. 5 is another view of a portion of the dual spindle machine tool of FIG. 3a showing additional control features;

FIGS. 6a and 6b show an enlarged sectional view of a portion of the dual spindle tool showing features of the spindle drive and other details;

FIG. 7 is another enlarged sectional view of a portion of the dual spindle machine tool showing details of the tool magazine drive and the tool changer mechanism;

FIG. 8 is an enlarged cross-sectional view of additional details of the dual spindle assembly;

FIG. 9 is a circuit diagram of a typical pushbutton circuit showing how the electromagnetic actuators of the various solenoid valves may be energized;

FIG. 10 is a block diagram of a typical main table or tool magazine indexing circuit;

FIG. 11 is a block diagram of a typical feed rate control system for a tool carriage or for controlling movement of the table, either horizontally or vertically;

FIG. 12 depicts the movements of the tool changer for a tool loading cycle;

FIG. 13 depicts the movements of the tool changer for a tool unloading cycle;

FIG. 14 is a block diagram of a system for rotating and indexing the dual spindle assembly;

FIG. 15 is a detail diagram of a portion of the circuit of FIG. 14; and

FIG. 16 is a detail diagram showing the control of the valves for controlling rotation of the main table.

A general assembly of a machine tool embodying the principles of this invention is illustrated in FIGS. 1 and 2. The general arrangement illustrated therein involves a plurality of machine tools which are arranged about a common base. The common or main base is generally designated 1 and mounts a table 2 for rotation about a vertical axis for cross-feed and for vertical movement. The base 1 is provided with 3 side faces receiving, respectively, tool bases 3, 4 and 5 thereabout which in turn respectively, slidably mount a dual spindle machine tool 6, a mill 7 and a multiple spindle drill 8. The arrangement is such that the table 2, which is suited for mounting and positioning a workpiece, may be properly presented to any one of the dual spindle machine tool, the mill or the multiple spindle drill for the performance of the desired machining operations. Normally, this presentation of the workpiece will be in some sequence, as required for performing of the operations. As will be seen, this assembly may comprise any one of the three machine tools indicated along with the table. Thus, the assembly need not be sold as a complete unit but may be sold as an assembly of the table and any one or more of the tools illustrated, or other tools, to achieve the needed capability and type of machine operation.

This invention is particularly concerned with the dual spindle head machine tool; accordingly, this description will be directed primarily to this aspect of the machine tool assembly which has been illustrated in FIGS. 1 and 2.

The dual spindle machine tool comprises a tool carriage 9 which is suitably mounted and guided on ways 10 on the upper face of machine tool base 3. The geometry of this arrangement is such as to provide freedom for horizontal movement of the tool carriage 9 toward and away from the table 2. The dual spindle machine tool further comprises a housing 11. Mounted on the left end of this housing, as viewed in FIG. 2, is a spindle drive motor 12 which powers that spindle of the dual spindle assembly 13 which is in a horizontal position. As will be seen, the dual spindle assembly comprises respective spindles 14 and 15 which are angularly displaced from one another and rotatably mounted in a substantially hemispherical support 13a. A circular slide bearing 17 mounts the hemispherical support 13a for rotation about an axis which substantially bisects the angle between the spindles 14 and 15. Slide bearing 17 is disposed at such an angle that, as illustrated, the spindle 14 which is in the active position is disposed substantially horizontally to properly present a tool 18 to a workpiece, generally designated 19, which is mounted upon the table 2.

The use of the dual spindle assembly always provides an inactive spindle in which tools may be loaded during a machining operation. To this end, a tool magazine, generally designated 20, is mounted upon the tool housing and therefore moves as a unit with the spindle assembly on the carriage as the carriage is moved back and forth to feed and retract the active spindle. This tool magazine is rotatable about a substantially vertical axis and carries a plurality of tools 18 in circumferentially spaced slots therein.

A tool changer 21 is mounted above the tool magazine and is hydraulically propelled through a sequence of movements in different directions for both tool loading and tool unloading cycles, as will be described hereinafter, for the purpose of exchanging tools between the tool magazine and the inactive tool spindle, that is, the tool spindle which is positioned in tool exchanging position.

As will be noted from this discussion of the general assembly of the universal machine tool, with reference to FIGS. 1 and 2, tool selection and tool exchanging may take place during a machining operation. Once a machining operation is completed, the active tool need only be retracted a distance sufficient to clear the tool from the confronting face of the workpiece. Thereafter, the spindle assembly may be rotated about its axis to interchange the active and inactive spindles to present a new tool to the workpiece. Unloading and reloading of the inactive spindle may now take place as the new machining operation is progressing.

Two advantages are realized from this structural organization. First, the extent of retraction of the tool spindle with respect to the workpiece is minimum, since by carrying the tool magazine with the spindle assembly there is no requirement to retract a tool spindle to a position with respect to a remote magazine where it may be unloaded and reloaded. Secondly, the time involved with respect to machining in effecting a tool change with this arrangement is minimal since normally the only time involved with respect to machine operations is that required to retract a tool to a workpiece clearance position and thereafter to rotate the spindle assembly to bring the new tool into working or active position.

The details of this organization and the further benefits and advantages derived therefrom will be evident from the more detailed descriptions of the general assembly which follows. In this connection, reference may be made to FIGS. 3a through 3c and to the detailed enlarged section views of FIGS. 6, 7 and 8.

*Main table*

The main table assembly is illustrated in FIGS. 3a and 4. This assembly comprises the substantially rectangular base 1, the upper surface of which is provided with ways 22. Ways 22 mount a table carriage 23 permitting horizontal movement of the table transversely of the axis of the active spindle of the dual spindle assembly. Carriage 23 supports a table housing 24 which mounts the table 2 and the rotary and vertical drives for the table, generally designated 25 and 26. Housing 24 is provided with a central cylindrical cavity 27 which receives a cylindrical column 28, the upper surface of which terminates in a circular way or track 29 which rotatably mounts the table 2.

The table 2 is rotated by means of a hydraulic drive motor 30, the output pinion 31 of which engages an input gear 32 of a gear train designated 33. This gear train includes a vertical shaft assembly, generally designated 34, having a long telescoping splined shaft section 35 and terminating at its upper end in an output pinion 36 engaging an internal ring gear 37 which is mounted in a position on the under surface of table 2 concentric with the axis of rotation of the table. By this expedient the table may be elevated and lowered while maintaining engagement with the gear drive 33 in the coupling provisions afforded by the long spline 35.

Since it is desired to identify differing angular positions of the table so that the table may be indexed in selected angular positions, binary number limit switches LS1 to LS4 and stop limit switch LS5 are provided in a position to one side and beneath the table 2. Cam rows, each including cams C1 to C5, provided in predetermined circumferentially spaced positions in vertical rows on a depending skirt 40 on table 2, actuate selected ones of binary limit switches LS1 to LS4 in order to provide a limit switch configuration differing from all of the others for each particular angular position of the table. With an arrangement of this type it is possible to establish an electrical configuration of discrete signals. The discrete signal pattern of some suitable type of electrical signal storage device indicating a desired indexed position may then be compared with the instant electrical configuration afforded by these switches and, at such time as the discrete signal configurations are identical, the selected indexed position of the table has been achieved.

In order to achieve positive indexing of the table in any selected position indicated by the particular electrical configuration of discrete signals produced by limit switches and stop switch LS1 to LS5, indexing pin 50, powered by a piston 51, is provided. Direct coupling between the piston and index pin may be provided. Where space requirements do not permit direct coupling, a stem 51a of the piston may be provided with a rack engaging a suitable pinion. This pinion may be coupled by means of a shaft to a second pinion engaging a rack which is cut into the indexing or detent pin 50, as shown. Piston 51 operates in a suitable cylinder 52 which is disposed in the table base.

Facilities may also be provided for clamping the table in any one of its indexed positions. To this end, a clamp 53, powered by a piston 54 in a cylinder 55 in the table base, may be provided. Fluid pressure may be applied to either end of the table clamping piston so that no clamp drag will be present during a positioning movement of the table.

The vertical or elevation drive of the table, which is generally designated 26, comprises a hydraulic motor 41 which powers a gear train, generally designated 42. This gear train drives a lead screw 43 which parallels the axis of displacement of the table in elevation. A nut 44 threads over the lead screw and is secured in a suitable bracket 45 within the circular table base 28. Rotation of the lead screw is therefore effective to raise or lower the table 2, depending upon the direction of lead screw rotation.

For certain types of operation it is desired to control the rate at which the table will be elevated or lowered. In this instance, a suitable servovalve S41 is provided, for instance, of a type described in U.S. Patent 2,933,269, or of some simpler variety which permits controlling the rate of flow of hydraulic fluid under pressure to the hydraulic servomotor 41 and which, additionally, permits control of the direction of rotation of the hydraulic servomotor. This will be discussed at a later point herein.

Provision is made for clamping the table in any selected elevated position. This is accomplished in an arrangement including a pair of axially disposed bellows-type clamps 47 and 48 which are disposed about the cylindrical table base 28, attached or secured in a suitably bored section of the table housing 24. A hydraulic line L12 communicates to the cavity between the confronting edges of the bellows clamps. When hydraulic fluid under pressure is admitted to this cavity formed between the confronting axial faces of the bellows clamps, the clamps are compressed axially and thus increase in radial dimension, securely engaging the cylindrical base section 28 of the table with the table housing 24 to clamp the table in a particular elevated position. Removal of hydraulic pressure from the line L12, of course, results in evacuation of the fluid admitted between the bellows clamps by reason of the extending spring action of the bellows, resulting in a decrease in the radial dimension of the bellows and consequent release of the clamping action.

Mechanism providing cross-feed of the table is illustrated in FIG. 4. As will be recalled from the description concerning FIG. 3a, the table is supported by means of a table carriage 23 which rides in ways 22 providing freedom of cross-feed movement. Cross-feed is obtained by means of a lead screw 60 driven by a suitable gear drive 61a, for example, similar to the gear drive 42 in FIG. 3a, which is powered by means of a cross-feed hydraulic motor 61 which, like elevating motor 41, is controlled by a rate valve S62 which controls the rate of admission of hydraulic fluid under pressure to the hydraulic motor 61, and further controls the direction of rotation of this motor. Here also details of this type of drive will be considered at a later point. Lead screw 60 engages a nut, not shown, which is connected to the table housing or support 24. Thus, when the lead screw is rotated, the table 2, supported on the table carriage 23, is propelled in cross-feed, one direction or the other, at a particularly selected feed rate. Here also provision is made for clamping the table in any selected cross-feed position. This is achieved by means of a normally disengaged clamp 63 which is actuated by a cam 64 to clamp the table carriage 23 on ways 22. Cam 64 is engaged with a lever 65 pivotally mounted at 66. The free end of lever 65 is engaged by a piston 67 which is hydraulically powered between two positions displacing the cam 64 selectively to engage and disengage the clamp 63.

In order to minimize the table load on the elevation table drive, provision is made for effectively hydraulically floating the table. This is accomplished by the provision of a long piston 70 which, as seen in FIG. 4, is secured at its lower end to the table housing or support 24. A cylinder 71, secured in the cylindrical table base 28, receives a piston 70. Fluid under pressure is admitted to the top side of the piston 70 by means of a hydraulic line 72. The total force exerted by the hydraulic pressure head acting between the ends of the piston and cylinder is sufficient to substantially carry the weight of the table and additionally affords some damping action in the movement of the table in elevation.

DUAL SPINDLE MACHINE TOOL

Dual spindle assembly

The details of the Dual Spindle machine tool appear in FIGS. 3a, 5, 6a, 6b, 7 and 8. As described in connection with FIG. 1, this assembly comprises two spindles 14 and 15 constituting a dual spindle assembly 13. The spindle assembly is mounted for movement or rotation about an axis bisecting the angle between the two spindles on the circular track 17 mounted on a sloping face 81 of the machine tool housing 11. A hydraulic motor 82 is mounted internally off housing 11 and is provided with an output pinion 83 engaging a gear drive 84 having an output pinion 85 engaging an external ring gear 86 which is secured to the flat base of the hemispherical section 13a of dual spindle assembly 13. Circular track 17 provides a secure mount for hemispherical support 13a permitting rotation about an axis bisecting the angle formed by the spindle axis under the power of hydraulic motor 82.

Provision is made for indicating the angular position of the head assembly. In operation no attempt is made to distinguish between the two spindles. It is only necessary at any particular time to rotate the dual spindle assembly 180° and to accurately index and clamp the assembly in such positions. To this end a detent 90 powered by a piston 91 stroking in a cylinder 92 is positioned in tool housing 11 to stroke between a detent engaged position in which detent 90 engages the dual spindle assembly 13, or is retracted therefrom to permit rotation. A piston powered clamp 93 is similarly disclosed to clamp dual spindle assembly 13 to the tool housing 11 at such time as indexing has taken place.

Since it is necessary only to rotate the dual spindle assembly 13 180° for each positioning operation, only two limit switches are required in the positioning operation. One of these, a limit switch LS6, is actuated by a cam C6 which is disposed upon the dual spindle assembly 13 in such position as to slightly anticipate the final desired position. Limit switch LS6 therefore anticipates the final position and is used as part of a control, yet to be described, to effect slow-down prior to stopping. A limit switch LS7 may be identified as the stop limit switch. This limit switch is actuated by a cam C7 at the final stop position. Two such sets of cams are provided, although not illustrated, in positions displaced respectively 180°, or in diametrically opposite positions, externally of the hemispherical housing of dual spindle assembly 13.

Tool carriage assembly

Tool carriage 9, as earlier pointed out, is mounted for sliding movement on ways 10. The tool carriage assembly, including the dual spindle assembly, is powered by means of a lead screw 95 which is driven through a suitable gear train 96a, not shown in detail, by means of a hydraulic motor 96. A nut 97 is threaded over the lead screw 95 and is secured to a standoff bracket 98 depending from the tool carriage 9. Hence, rotation of lead screw 95 effectively displaces the tool carriage 9 in a direction determined by lead screw rotation. A servo rate valve S99 controls the admission of hydraulic fluid to hydraulic motor 96. This valve, like the preceding rate valves referred to, contains a valve spool, the position of which determines the flow rate and the direction of flow through the hydraulic motor. The actual control of rate is achieved, as will be described, by applying a particular voltage to the rate valve control coils which is the difference between an input voltage representative of a desired rate and a feedback voltage derived from a tachometer generator T96 which is driven at a speed proportional to the speed of rotation of lead screw 95. Thus, the command rate is regulated.

Since it is desired to measure the position of the tool carriage along the ways from a home or retracted position, a position transducer, generally designated P96, is coupled into the drive 96a for lead screw 95 to be rotated thereby. Details of this transducer and scale counter circuits may be found by reference to application Serial No. 80,485, by Raymond C. Bell, filed January 3, 1961, entitled "Condition Responsive Electrical System," and assigned to the assignee of this invention. Briefly, this transducer assembly and associated equipment under the control of a carriage operated limit switch begins counting lead screw revolutions at a precise point from the home or retracted position of the tool carriage indicated by the limit switch. Calibration is such that increments of displacement 1 mil or less are counted.

Control of the tool carriage movement includes a plurality of limit switches. Limit switch LS8 may be employed with scale counter circuits referred to in the copending application aforesaid. This limit switch, as described in that application, as the tool carriage moves out of home or retract position, enables circuits which control the counting of displacement increments. A limit switch LS9 may be a slow-down limit switch which is utilized in positioning circuits, for instance, in retracting the tool carriage, to drop the rate of retraction from traverse speed to creep speed. Limit switch LS10 is a stop limit switch and is utilized to restore the servovalve to neutral position and cut off hydraulic fluid to the hydraulic motor 96.

TOOL MAGAZINE

The tool carriage assembly, including machine tool housing 11, also carries the tool magazine 20 and the tool changing mechanism 21. As illustrated in FIGS. 3a and 7, the tool magazine is rotated about a vertical shaft 105 which projects from the upper surface of the machine tool housing 11. Tool magazine 20 is of circular plan-form having an outwardly turned peripheral rim 20a which is disposed at an angle to the plane of the tool magazine. This peripheral rim is provided with a plurality of slots 106 perpendicular to the rim face, adapted to receive the identical shanks 107 of the respective cutting tool assemblies 18. As will be seen, the slots incline the axes of the respective cutting tool assemblies so that at least that tool which is indexed with respect to the inactive spindle, for insance, spindle 15 in FIG. 3a, parallels the inactive spindle axis.

A depending cylindrical section 108 of tool magazine 20, forming part of the tool magazine journal, is provided with vertical rows of spaced cams, each including cams C12 to C17. The vertical rows are equally circumferentially spaced around the depending cylindrical section 108. These circumferentially spaced rows of cams, which are equal in number to the number of tool slots 106 in the tool magazine, are used to actuate a bank of switches, equal in number to the number of cams in each vertical row, to identify the particular angular position of the drum. The configuration of each row of cams differs from that of the others; hence, as with the table, the switch configuration and the electrical signals produced by the switch circuits, identify a particular angular position of the drum.

Tool magazine 20 is powered by means of a hydraulic motor 115 which drives a gear train 116 having an output pinion engaging an externally toothed ring gear 117. Hydraulic motor 115 and elements of gear train 116 are supported by a platform 115a mounted on the upper end of vertical shaft 105. The supply of hydraulic fluid to tool magazine motor 115 is controlled by a circuit of the type diagrammatically depicted in FIG. 10, yet to be described, in which the selection of a particular tool by a set of discrete command signals is instrumental in displacing the tool magazine until such time as the binary number switches of switch group LS12 to LS17 produce a corresponding set of electrical signals.

Provision is made for indexing the tool magazine in the form of a detent 120 powered by a piston 121. Provision is also made, as will be explained hereinafter, for insuring removal of the detent prior to the time that power is applied to hydraulic motor 115.

*Spindle clutch and drive mechanism*

FIGS. 5 and 6a show the details of a clutch mechanism or coupling which is employed to couple and decouple the active tool spindle from the spindle drive mechanism. In the interest of simplicity, the tool magazine 20 is not shown in FIG. 5. To this end, a positive type coupling or clutch 125 is provided, including a power shaft carried input member 126 having holes 126a and a spindle carried output member 127 having pins 127a. Input member 126 is mounted on a long splined power shaft 128 which connects with a push-pull clutch actuating rod 129 coaxially disposed of power shaft 130. The exposed end 131 of clutch actuating rod 129 connects to an arm 132 which is powered by a piston 133 between clutch or coupling engaging position, as shown, and a fully retracted position which is to the left of the position indicated and which disengages the clutch members.

The spindle gear drive, generally designated 135 (see FIG. 6a) is conventional. This gear drive is powered by means of the electric motor 12. Disc clutches 137, 138 and 139 and 140 provide facilities for speed changes and for reversing the direction of spindle rotation. A limit switch LS20, actuated by a two-piece cam C20 indicates the two extremes of positions of the coupling piston 133.

TOOL CLAMPING MECHANISM

FIGS. 5, 6b and 8 depict the mechanism for actuating the tool clamps in the respective spindles. FIG. 6b shows the details of the tool clamps. The tool clamps and tool spindles are identical. The tool clamping mechanism, generally designated 141, as will be seen by reference to FIG. 6b, comprises a bellows shaped clamp 142 fitted concentrically within a rotatably mounted tubular spindle shaft 149 in spindle 14. Like the table elevation clamps previously described, this clamp when unloaded extends axially and thereby contracts radially to release shank 107 of the cutting tool assembly 18. As will be seen, the tool shank terminates in a reduced diameter flange 107a which is spaced from the back end of tool shank 107 and cooperates with pivotally mounted levers 143, the free ends of which engage the flange 107a to seat the tool shank in the clamp.

The clamping mechanism which forms a part of each of the spindles comprises an axially displaceable cylindrical actuator 144 which terminates in an actuating rod 145. A spring 146, disposed about rod 145 and clamped and compressed between a retaining washer 147 on the end of rod 145 and a shoulder 148 internally of spindle shaft 149, spring loads the cylindrical tool clamp actuator 144 to retracted position. A sleeve 150 is disposed between the end of actuator 144 and the end of tool clamp 142. A lever 151 is pivotally mounted on a pin 152 carried by pin supports 153a on a cup-shaped lever support and actuator 153 slidably fitted in the sleeve 150. Lever 151 is provided with a lower projection 151a which is restrained between a fixed stop 154 projecting radially into the actuator 144 from the spindle shaft 149, and a shoulder 155 on sleeve 150. The lever support and actuator 153 is provided with slots 153b through which the ends of respective levers 143 project into positions engaging flange 107a on the back end of the tool shank. Since the stop 154 is fixed it will be seen that displacement of sleeve 150 is limited by projection 151a of lever 151 in a direction to the left and is limited by the tool clamp 142 in a direction to the right.

In the position illustrated, the shank of the tool assembly is clamped by an axial compression force applied thereto by sleeve 150. This is applied as follows: when actuator 144 is positioned in its left position, as indicated, under the force of the spring 146, lever 151 rocks about projection 151a pivoting about its pivot 152 on the lever support and actuator 153. The force causing this displacement of lever 151 is applied by the edge of a slot 144a of actuator 144 against a projection 151b of lever 151 disposed therein. Displacement of pin 152 to the left pulls the lever support and actuator 153. Slots 153b in this sleeve, engaging the extremities of levers 143 bias the extremities of the levers into engagement with flange 107a on the tool shank, imparting a force to the left. When the tool shank is properly seated in the tool clamp, movement of the lever support and actuator 153 is arrested. Continued movement of actuator 144 to the left now affects counter-clockwise rotation of lever 151 about the pin 152. Projection 151a of lever 151 now drives sleeve 150 to the right as viewed, applying an axial compression force to the tool clamp 142 causing radial expansion and secure gripping of the tool. This is the normal position of the clamp.

Displacement of rod 145 to the right against the compression load of the spring 146 displaces tool clamp actuator 144 to the right rotating lever 151 clockwise about projection 151a. In this position pin 152 is displaced toward the right and the edges of slots 153b engaging levers 143 rotate these last named levers in directions to clear the lever extremities from positions adjacent the flange 107a, permitting the flange 107a to pass therebetween. Since the levers have been disengaged, pin 152 is now no longer restricted by the lever support and actuator 153; consequently, projection 151a no longer axially loads sleeve 150. The spring force of the bellows type tool clamp 142 acting to the left displaces the sleeve 150 sufficiently to permit releasing of the tool shank.

With these explanations, reference to FIGS. 5 and 8 may now be made for an explanation of the mechanism which actuates the tool clamp on the inactive tool spindle. As will be apparent, at any time a tool is to be inserted into or removed from a spindle it is necessary that the tool clamp shall be released. This is accomplished by means of a piston-powered actuator, generally designated 160. This actuator assembly comprises a piston 161 located in the lower portion of the housing 11 just behind the dual spindle assembly 13. Piston 161 is connected to a rod 162, the upper end of which is connected with a lever 163 pivotally mounted on a bracket 164 secured in housing 11. Normally piston 161 is maintained in elevated position in which position a projection 163a on the free end of lever 163 is displaced sufficiently to clear projecting pins 127a of output coupling member 127. After the dual spindle assembly is indexed and clamped provision is made for displacing piston 161 downwardly to a position in which projection 163a engages and displaces rod 145 of actuator 144 thereby releasing the tool clamp.

*Tool changing mechanism*

The tool changing mechanism 21, as illustrated in FIGS. 3a and 7, is mounted above tool magazine 20 on the support 115a mounted on the top of the vertical shaft 105 and which also supports hydraulic motor 115 which powers the tool magazine. Support 115a is stationary and carries a pair of side plates, one of which is illustrated and designated 165. Plates 165 mount a cylinder 166 containing a two-piece piston assembly, generally designated 167. Piston rod 168 forming part of this piston assembly is connected to a slidably mounted tool changer carriage 169. Tool changer carriage 169 includes a cylinder 170 and a piston 171 therein having a piston rod 172 which connects to and drives a slidably mounted tool handler 173. Tool handler 173 terminates in a pair of opposed spring loaded jaws 174 and 175 pivotally mounted on a common pin 175a and which are provided with confronting, arcuate faces adapted to grip a tool holding section 18a on each of the tools. These tool holding sections are identical. The free ends of the jaws on the tool changing mechanism are spaced sufficiently that when the free ends of the jaws are thrust against the tool holding section 18a the jaws are biased apart by the force of this engagement and thereafter are biased together by a compression spring 176 to firmly clamp the tool.

Piston assembly 167 provides two stages for the total transverse stroke of the tool changer mechanism with respect to the tool which is to be changed. In this connection, reference may be made to FIGS. 12 and 13. FIG. 12 shows the loading cycle. This cycle takes place when the inactive spindle is empty and when the tool changer mechanism is in fully retracted or home position and after the desired tool is positioned adjacent the inactive spindle. Both FIGS. 3a and 7 show the tool changer mechanism 21 at the end of the first portion of the transverse stroke. For the purposes of this discussion it will be assumed that the tool changer assembly is retracted fully to the left as viewed, in which case pistons 177 and 178 of piston assembly 167 are displaced fully to the left, as viewed. Additionally, it will be assumed there is no tool in the inactive spindle 15.

The tool loading cycle is initiated by admitting fluid under pressure to the cylinder 166 at port 179 adjacent the face of piston 177. This displaces the dual piston assembly 167 to the right as viewed carrying with it the tool changer carriage 169 and the tool change mechanism thereon. Port 180 which is at the other end of the cylinder section in which piston 177 strokes is now connected to drain or to the tank and port 181 at the far right end of the cylinder in which piston 178 is stroked is connected to fluid pressure of the same pressure as that applied to port 179. Note should be made of the fact that pistons 177 and 178 are of differing diameter; hence, the application of pressure simultaneously to opposite ends of these pistons result in a force unbalance in favor of piston 177 moving the dual piston assembly 167 to the right. When piston 177 reaches the end of its stroke the assembly stops moving. At the end of the stroke of piston 177 the tool handler 173 is in the position illustrated in FIGS. 3a and 7 with the tool handler jaws 174, 175 engaging the tool holding section 18a of the selected tool.

At this point the admission of hydraulic fluid under pressure to port 182 strokes the tool handler in elevation in a direction paralleling the axis of the engaged tool, removing the tool from slot 106 in the tool magazine. Pressure is retained on port 182 to maintain the tool handler 173 in this elevated position.

The fluid pressure is now reversed between ports 180 and 181 associated with piston 178. Piston 177 is a separable part of the dual piston assembly and can only impart a pushing force thereto. Pressure is retained on port 179 at this time. The application of fluid under pressure to port 180 and the connection of port 181 to drain results in stroking of piston 178 and consequently the tool handler 173 an additional distance to the right sufficient to align the axis of tool 18 with the axis of the inactive spindle, in this instance spindle 15.

Assuming that the tool clamp in spindle 15 has been released, as earlier described, the reversal of pressure on the ports of the elevating cylinder 170, that is, the application of fluid pressure to port 183 and the connection of port 182 to drain now results in lowering of the tool handler, inserting the tool shank 107 into the now released clamp. Thereafter, the tool clamp is set, securing the tool shank in the spindle.

At this point the tool handler may be fully retracted. To accomplish this, fluid under pressure is applied to port 181 and ports 179 and 180 are connected to drain. Thus, during the first portion of the return stroke the jaws of the tool changer are disengaged from the tool holding section 18a of the tool in the spindle. Thereafter, the continued application of pressure to port 181 returns the piston 178 to the full left end of its stroke, in which position the tool handler 173 is completely retracted.

Hydraulic system

As will be seen by reference to FIGS. 3a, 3b, and 3c, viewed together, and also FIGS. 4 and 5, the various hydraulic elements of the machine tool are controlled by means of electromagnetically actuated hydraulic valves V1 through V17 and a directional valve DV, which latter is used specifically for controlling the direction of table rotation. All of these valves are conventional and are obtainable commercially; hence, no effort has been made to specifically illustrate the details of these valves. The valves are represented schematically referring, for example, to valve Vi which is typical of all of the valves bearing the identification characteristic V. It will be seen that the lower section of this valve has two oppositely directed arrows transversely thereof and that the upper section of this valve has two arrows in crossed relationship with the heads of these arrows pointed downwardly. This depicts the deenergized condition of the valve and indicates that the flow pattern through the valve is in the direction depicted by the horizontally disposed arrows. The crossed arrows indicate that upon energization of the valve the ports associated with the horizontally disposed arrows are reversed and consequently the fluid flow at the output of the valve is reversed.

With reference to the directional valve DV the inlet and outlet ports of the valve when the valve is de-energized are not interconnected; hence, no fluid transfer across the valve is obtained. The valve may be energized in one sense through one electromagnetic actuator to port fluid from an inlet pressure port to one of the outlet ports and from the other outlet port to the drain or tank. When the other electromagnetic actuator is energized this flow pattern is reversed to effect a reversal in fluid pressure and fluid flow through the hydraulic motor controlled thereby. This valve is normally spring centered and maintained closed by balanced spring forces.

Regulated hydraulic pressure of a selected value, say of the order of 300 to 500 pounds per square inch, is applied from a hydraulic fluid pressure source, generally designated P1. This selected pressure is regulated by means of a pressure regulating valve PV1 connected between pressure source P1 and a hydraulic line PL1. A second source of hydraulic pressure, generally designated P2, is coupled through a valve PV2 to a line PL2 to provide a higher pressure, say of the order of 1,000 pounds per square inch. Line PL3 is the drain or tank return line. Line PL4 is a pressure line which is connected to piston 70 to apply the table "floating" pressure to minimize loading of the vertical or table elevation drive.

Referring to the table drive, hydraulic motor 30 is powered for rotation in one direction or the other depending upon which of the electromagnets D1 or D2 of the valve DV is energized.

The table is operated in rapid traverse and creep modes for positioning purposes. To this end, a rapid traverse orifice and a creep orifice K6 and K5, respectively, are provided in the drain or tank line between port T of the valve DV and line PL3. A valve V13, which is normally closed when de-energized, is connected in a position shunting the creep orifice K5.

In operation, when the table is to be moved to a new position, electromagnet E13 of the valve V13 is energized which completes a hydraulic circuit shunting the creep orifice K5 leaving only the rapid traverse orifice in series in the line returning hydraulic fluid to the tank line PL3. Thereafter, valve DV is energized to port pressure selectively between output ports A and B. Limit switches LS1 to LS5, which may be identified as the binary number switches (LS5 being the stop switch), are positioned to anticipate a final position, that is the switches are disposed in an angular position ahead of the final angular position. As the table moves into position, these switches are employed to de-energize valve V13 cutting off the shunt path about the creep orifice K5. This inserts the creep orifice in series in the hydraulic return line and consequently slows hydraulic servomotor 30 to creep speed. Stop switch LS5, which is actuated in the indexed position, is instrumental in de-energizing the directional valve DV to stop the table. At this point the table is sufficiently closely positioned to the precise mechanical index so that actuation of table detent 50 positively indexes the table in the final accurate position. Thereafter, the table may be clamped by actuation of clamp 54.

Table elevation which is controlled by hydraulic motor 41 is under the control of a servovalve S41 which is a rate valve. Such a valve may be of the type described in Patent No. 2,933,269 and illustrated in FIG. 3 therein, or some other simpler and less expensive type of rate valve. The position of the valve spool in such a valve which ports fluid to and from the hydraulic motor 41 is electromagnetically controlled. As will be described hereinafter in connection with FIG. 11, an input signal is applied to the valve commanding a particular flow rate. The flow rate is regulated by the feedback provided by a tachometer generator T41 which is driven at a speed proportional to the speed of operation of hydraulic servomotor 41. Hence, the output voltage is proportional to the rate of displacement in elevation of the table. By this expedient, speed regulation is achieved.

If desired, the gear drive 42 associated with the hydraulic servomotor 41 may be locked in any particular position in which the servo is stopped. This may be accomplished by means of a piston operated detent D41 having a detent engageable with a selected gear in the gear drive 42. At any time that the servo rate valve is to be operated, the piston operated detent must be retracted. To this end a valve V14 is provided to control the application of hydraulic fluid to the piston operated detent D41. In de-energized condition this valve ports fluid to the bottom side of a detent piston lifting the piston and unlocking the gear drive. At such time as the servomotor 41 is stopped, lockup of drive 42 is achieved by energizing valve V14. In energized condition valve V14 connects the detent piston to drain and permits the detent to engage the gear drive to lock up the drive in the position in which it has been stopped.

Cross-feed of the table (see FIG. 4) is controlled in a manner similar to movement in elevation. Servo rate valve S62 which may be similar to that referred to hereinabove controls the flow rate of hydraulic fluid under pressure to hydraulic servomotor 61. The table clamp 63 and associated equipment is controlled by means of an electromagnetically operated hydraulic valve V17. In de-energized condition valve V17 ports hydraulic fluid under pressure to the bottom side of clamp actuating piston 67 elevating this piston and releasing the clamp. When the valve is energized the clamping piston is actuated in a reverse direction to apply the table clamp and secure the table. Valve V17 will therefore be interlocked with the control of the servo rate valve S62.

Valve V12 controls the application of hydraulic fluid to the table clamp 48 via hydraulic line L12. In de-energized condition fluid under pressure is ported to this clamp to secure the table. When it is desired to release the table this valve must be energized.

Table detent valve V11 includes an outlet port A which is connected to the bottom of the cylinder in which the detent piston 51 strokes via line L11a. A branch of this line connects to a point above the bottom of the cylinder but beneath the piston 51 in its fully elevated position. A port 185 in the detent cylinder communicates with a pressure switch PS1 which may be used for indicating or control purposes, and includes a branch line communicating with the top side of cylinder 55 in which clamp piston 54 strokes. Port 185 is also beneath the bottom face of detent piston 51 when this piston is in the elevated position indicated. Thus, with valve V11 de-energized, fluid under pressure is ported to the bottom of the detent piston elevating this piston and at the same time when the piston is fully elevated, indicating the detent has been set, ports fluid to the top side of clamp piston 54 to clamp the table. The return line is L11b. When valve V11 is energized pressure is applied to outlet port B. Fluid under pressure is now applied via line L11b to the bottom side of piston 54 to effect unclamping of the table and is ported to the top side of the detent piston 51 to cause this piston to fully retract.

Electromagnetically operated hydraulic valves V15 and V16 control hydraulically operated clamps on the carriages of the multiple spindle drill 8 and the mill 7. In each instance rates of movement of the carriages are controlled by servos and servo rate valves of the type described in connection with both the elevation and cross-feed drives of the table.

Valve V10 controls clamping and unclamping of the universal machine tool carriage 9. When this valve is deenergized fluid pressure is applied via line L10a to the bottom side of the clamping piston to cause carriage clamping. When this valve is energized the clamping piston is driven in a direction to release the clamp by means of pressure applied through line L10b.

The tool carriage hydraulic servo rate valve S99 is controlled in a manner similar to that described in connection with the elevation drive of table 2 and for the purpose of this discussion is assumed to be the same.

Electromagnetically operated valve V9 controls the speed of rotation of the dual spindle assembly 13. This valve functions in a manner similar to the valve V13, described hereinabove, and in de-energized position is closed. This valve is connected in a position to shunt a creep orifice K3 which is connected in series with a rapid traverse orifice K4 in a return line L9 from hydraulic servomotor 82. When energized this valve ports fluid around the creep orifice which leaves only the rapid traverse orifice K4 in series in the return line.

Valve V8 controls the detent 90 and the clamp 93 on the dual spindle assembly. When valve V8 is de-energized port A on this valve communicates via a line L8 to the bottom side of detent piston 91. When the detent is completely seated the line L8a interlocks clamp 93 with detent operation and ports fluid to the top side of the piston of clamp 93. Fluid pressure from this interlocked circuit may also be ported into a pressure switch PS5 for indication or control purposes. When energized, pressure port B of valve V8 via hydraulic line L8c applies fluid to the top side of the piston of detent 90 driving this piston to fully retracted position. When the detent is retracted sufficiently to release the dual spindle assembly 13 fluid is ported from line L8c across the top of the piston of retracted detent 90 via line L8d to the hydraulic servomotor 82 to cause operation of this motor to interchange the positions of the spindles. Simultaneously with the application of hydraulic fluid to the top side of the detent piston pressure is applied to the piston of clamp 93 to release the clamp.

Hydraulic valve V1 may be controlled with valve V8. When valve V1 is de-energized fluid under pressure is ported to the left side of clutch actuating piston 133 driving the clutch actuator in a direction to engage the clutch. Energization of this valve therefore operates to release the clutch. Timing of the control of this valve will be such with respect to valve V8 that the clutch will be disengaged prior to the time spindle rotation takes place and will be moved to engaged position only after the spindle has been stopped and indexed.

Valve V5 controls the tool clamp actuating mechanism 160. In de-energized condition valve V5 ports fluid to the bottom side of the piston 161 which displaces the tool clamping actuator lever 163 to fully retracted position. When a tool is to be loaded or unloaded valve V5 is de-energized to move the clamp actuator lever 163 into fully engaged position to release the tool clamp, as described in detail hereinabove. The operation of this valve may be electrically interlocked with indexing of the dual spindle assembly so that clamp release automatically takes place at such time as the indexing operation is completed.

Valves V2, V3 and V4 control the movements of the tool changer mechanism. Valve V2 controls the elevation movement of the tool handler. Valve V4 controls the first portion of the tool loading stroke and valve V3 controls the second portion of the tool loading stroke, both in directions transversely of the axis of the tool. A line L2 from outlet port A of valve V2 is connected to port 183 at the top side of the elevation piston 171; hence, in de-energized condition this valve is effective to lower or to hold the tool handler in lowered position. When energized, a line L2a, connected between outlet port B of valve V2 and port 182 of the elevation piston, applies fluid to the bottom side of elevation piston 171 of the tool handler to effect movement upwardly. Outlet port A of valve V4 is connected via a hydraulic line L4 to port 179 at the bottom of the cylinder 166. This applies pressure to the piston 177 moving the dual piston assembly 167 to the right as viewed to complete the first portion of the loading stroke. When the valve V4 is de-energized, port A is connected to the tank line and thereby removes pressure from piston 177 of the dual piston assembly.

In de-energized condition outlet port A of valve V3 is connected via a line L3 to port 181 at the top of cylinder 166 applying pressure to piston 178 of the dual spindle assembly. Normally during the first portion of the transverse stroke of the tool changing mechanism, pressure will be applied simultaneously at ports 179 and 181. This is the condition in which both of the valves V3 and V4 are de-energized. At the end of the first portion of the stroke the valve V2 is energized to effect elevation of the tool handler to clear the tool from the tool magazine. Thereafter, the valve V3 is energized, porting pressure to outlet port B which latter via the line L3a applies hydraulic fluid under pressure to port 180 of cylinder 166 thereby initiating the second portion of the transverse stroke of the tool changing mechanism. At the end of the resulting stroke the valve V2 is de-energized which lowers the tool handler inserting the tool in the tool clamp. After clamping takes place the valve V3 is de-energized which applies fluid under pressure to the port 181. Also, the valve V4 is energized which connects the port 179 to drain, or, to the tank line. The tool changer mechanism now strokes completely to the left disengaging the tool in the tool spindle and clearing the tools in the tool magazine.

The valve V7 controls the tool magazine detent 120. In de-energized condition, outlet port A of the valve V7 via a line L7 applies fluid to the bottom side of the piston 121 which actuates the detent. A line L7a communicates with a port exposed by the tool magazine detent piston 121 when in elevated position for the purpose of applying pressure to a pressure switch PS3 which may be utilized for indication or control purposes. When the valve V7 is energized outlet port B via a line L7b connects to the top side of the detent piston 121 releasing or retracting the detent. A line L7c to which pressure is communicated when the detent piston 121 is retracted, communicates with a pressure switch PS4 which may be used for indicating or control purposes.

Line L7c also connects with the hydraulic servo motor 115 which drives the tool magazine; hence, the tool magazine motor can be energized only at such time as the detent for the tool magazine is completely retracted. The speed at which the tool magazine is rotated is controlled by the creep and rapid traverse orifices K1 and K2. The creep orifice, as in previous, similar situations, is shunted by a normally de-energized, normally closed valve V6. In the de-energized condition of the valve V6, therefore, the flow rate of hydraulic fluid is such as to force operation of hydraulic servo motor 115 at creep speed. When the valve V6 is energized the creep orifice is shunted and the hydraulic motor operates at rapid traverse speed.

Electrical circuits

Energization of these various electromagnetically operated valves may be controlled by simple push-button circuits if desired, such as typically represented in FIG. 9, showing the connection of the actuator electromagnets E1 through E4 for the valves V1 through V4 only. It will be appreciated this circuit may be extended to include the electromagnets through E17 of the remaining valves. This circuit may be further extended to include interlocking features such as shown in FIG. 16 which particularly illustrates a circuit for the electromagnetic actuators D1 and D2 of the directional valve DV, to be described at a later point.

Energization of the electromagnetic actuators such as D1 or D2 and any one of the electromagnetic actuators E1 through E17 may also be accomplished in an arrangement diagrammatically illustrated in FIG. 10. Here a program unit 190 which may be either serial or parallel produces electrical outputs which are used to set any suitable type of flip flop register, for instance, generally designated 191. The number of output circuits which such a register may have depends upon the number of flip flops employed which in turn, is controlled by the number of different discrete conditions which must be indicated. Four outputs are here indicated. These outputs are shown as applied to a comparator gate 192 which may be a conventional diode type of gate comprised of a plurality of "and" circuits, say four "and" circuits, each of which may have two inputs. Patent 2,803,401, particularly FIG. 3, shows such "and" circuits. The output of the gate circuit when other than coincidence exists between the input provided by register 191 and the input from cam switches 193, for instance, table actuated switches LS1 to LS5, is applied as input to a suitable control circuit 194, for example, a relay, which, in turn, is used to energize the particular one of electromagnets E1 to E17 of valves V1 to V17 respectively, for instance, or an electromagnet D1 or D2, as represented by block 195. The output of the valve controls the associated hydraulic servo motor, here represented as a block 196, but which may be the table drive motor 30 or the tool magazine drive motor 115. The hydraulic servo motor drives a controlled member, here designated 197, but which may be table 2 or tool magazine 20, the angular position of which in turn controls the cam operated limit switches 193. When the inputs on the several "and" gates of circuit 192 are the same, the control signal to the control 194 may be interrupted to deenergize the valve and stop movement of the member which is being controlled.

These and other conventional expedients may be practiced without departing from the spirit and scope of this invention.

As will be recalled, several circuits are described herein for providing selected feed rates for certain of the members. One servo provides elevation of table 2 at a selected rate. The cross-feed servo provides cross-feed of the table 2 at a selected rate and feed rate control is provided for tool carriage 9. These servos are respectively powered by hydraulic motors identified by reference characters 41, 61 and 96. The servo valves S41, S62 and S99 controlling these respective motors are identified herein as rate valves (see Patent 2,933,269 supra). For a particular pilot valve pressure the displacement of the spool in this valve in one direction or the other from neutral or centered position, ports fluid in a direction corresponding to the direction of displacement and at a rate proportional to the amount of the displacement. As illustrated in the patent aforesaid, spool displacement is controlled by a suitable electromagnetically controlled pilot valve assembly which may form part of a conventional electrical bridge circuit which is unbalanced in one sense or the reverse by a suitable command signal. In each instance herein, tachometer generators driven at speeds proportional to the speed of the servo motor are coupled to the drives for the respective axis and thereby produce output voltages which are proportional to the speed at which movement in the respective axes takes place. This is applied as a feedback voltage in the system to regulate the feed rate to that which has been commanded.

FIG. 11 diagrammatically depicts a conventional circuit suitable for this purpose. Here again a conventional program unit 190 applies its output to a suitable storage device or register 191. The number of output circuits of this storage device or register again will be determined by the magnitude of the number which is to be represented for designating feed rates. In this instance, the output of register 191 is applied to a digital-to-analog converter 199. For instance, a converter of the type described in a patent to S. Hansen, 2,718,634. FIG. 1 of this patent depicts an attenuating network controlled by suitable switches which may be contact type switches or which may be the outputs of flip flops or trigger circuits controlled by flip flops as required. In FIG. 11 herein the voltage or current output of the digital-to-analog converter 199 is applied as input to a suitable control 200 which may be any conventional type of comparator circuit, such as a bridge circuit, which also receives as input the output of a tachometer generator TG. When the inputs to control circuit 200 are unequal this circuit produces an electrical output controlling a rate valve 201, the hydraulic fluid output of which, in turn, controls hydraulic motor 202. The hydraulic motor, being mechanically coupled to the member 203 being controlled and to the tachometer generator, displaces the controlled member and drives the tachometer generator at a speed proportional to the speed of movement of the member. This schematic representation of the drive of the tachometer generator is merely illustrative of one conventional system and represents the connection of such a tachometer generator anywhere in the motor drive for the member which is being controlled. System equilibrium occurs when the tachometer generator voltage is substantially equal to the command signal or voltage. Usually a slight voltage error exists in favor of the command signal to maintain pilot pressure in a small amount to overcome centering stiffness.

FIG. 14 diagrammatically illustrates a circuit arrangement of a type suitable for moving and indexing the dual spindle assembly 13. This circuit may utilize the input from a program unit 190 such as a tape reader or a push-button station as earlier described. The signal produced by the program unit actuates a control circuit which in turn produces an output signal energizing detent valve V8. As will be recalled, detent valve V8 when energized powers detent 90 to retract the detent and free the dual spindle assembly. Also, as described earlier, the dual spindle assembly is unclamped by hydraulic interlocking in the detent hydraulic circuit. This is not shown in FIG. 14 in the interest of simplicity. Hydraulic fluid passing through the retracted detent is illustrated in FIG. 14 as flowing through the slow valve to the dual spindle motor. This is a series hydraulic circuit. It differs from the hydraulic circuit illustrated in FIGS. 3a and 3b in that the positions of the slow valve and the head motor V9 and 82, respectively, have been interchanged. Head motor 82 drives the dual spindle assembly 13 and in so doing operates limit switches LS6 and LS7. LS6, identified as the slow limit switch, is utilized to control the slow valve. As earlier described, limit switch LS6 is positioned a sufficient distance ahead of indexed position to anticipate arrival at indexed position. Actuation of limit switch LS6 de-energizes the slow valve V9 which inserts creep orifice K3 (see FIG. 3b) into the hydraulic circuit to reduce the speed of rotation of the dual spindle assembly to creep speed. When indexed position is reached stop limit switch LS7 is actuated which operates the control to de-energize detent valve V8 which displaces the detent towards engaged position and in the process cuts off hydraulic fluid to motor 82.

A control circuit, such as the circuit 204, need not be a complex arrangement. If used in conjunction with a program unit, usually some type of stepping switch control will be provided which may be utilized to initiate operation. In manual modes a separate manual switch is used. To this end, in FIG. 15, a relay R6 having contacts R6a is utilized to control the energization of electromagnet E8 of detent valve V8. Relay R6 is controlled in a circuit including parallel connected contacts SS1 and R7a. Contacts SS1 may be stepping switch contacts on a stepping switch which is stepped incrementally with the tape which is being read, or may be a contact such as a push-button on a manual control console. Contacts R7a are normally closed contacts of a relay R7 controlled in a power circuit including limit switch contacts LS7 in series. Energization of the detent valve is achieved by closing contacts SS1 completing a circuit across the power supply to energize the coil of relay R6 and close contacts R6a. In this connection, it is assumed that contacts LS7 are normally closed when the dual spindle assembly is indexed so that relay R7 is energized and contacts R7a opened. Thus, the stepping switch contact or the push-button is instrumental in initially energizing the relay R6. With energization of the detent valve V8 and subsequent displacement of the dual spindle assembly from indexed position, limit switch LS7 opens and drops relay R7. Contacts R7a now form a voltage circuit for the coil of relay R6 which is maintained until such time as indexed position is again reached, at which time the limit switch LS7 which picks up relay R7 is closed, opening contacts R7a and dropping relay R6 to de-energize valve V8.

FIG. 16 illustrates a typical circuit for controlling the table 2. As will be recalled, table 2 is controlled by a directional valve DV, directional valve DV being controlled by electromagnetic actuators D1 and D2 and selectively porting pressure between output ports A and B depending upon which of the actuators is energized. This controls the direction of rotation of the hydraulic motor 30 and consequently controls the direction of rotation of table 2. As earlier described herein, the main table is provided with a plurality of binary number cam actuated switches designated LS1 to LS4 and a cam actuated stop switch. Axial rows of spaced cams distributed in each of the several indexed positions about a skirt on the main table are disposed in positions to actuate the binary number switches as the cams sweep past. Thus the configuration of the binary number switches, that is, open or closed, provides a discrete electrical circuit configuration indicative of an angular position of the table. A program unit 190 which may be any suitable automatic numerical type or which may be a push-button station for a manual control console, comprises a plurality of individual switches S1 through S5, as illustrated, which are set in accordance with the program to identify a particular angular position of the table. Corresponding contacts of the binary number switches LS1 through LS4 and binary number program control switches S1 through S4 are electrically interconnected and the common terminals of the binary number program control switches S1 to S4 are connected in circuits with respective relays R1 through R4. This circuit may be energized by a suitable direct current power supply, as shown. Relays R1 through R4 are provided with normally closed contacts R1c through R4c which are connected in parallel in a circuit including the electromagnetic actuator E13 of valve V13 which is the slow-down valve for table motor 30. This valve, as earlier noted, shunts creep orifice K5 and must be energized to be opened to achieve the hydraulic shunting action. The rapid traverse orifice is K6.

If it is assumed that the main table switches are all in the same position, as illustrated, and that a particular angular position requires switches S1 and S4 to be set in engagement with their upper contacts and switches S2 and S3 in engagement with their lower contacts, as shown, it will be seen that only relays R1 and R4 of the relay group will be energized. Thus, valve E13 is energized shunting the creep orifice K5. Assuming further the directional program switch S5 has been set to energize valve actuator D1, hydraulic fluid is ported to hydraulic motor 30 in a sense to achieve the desired direction of table rotation. Initially table rotation in rapid traverse is affected. As the table rotates switches LS1 through LS4 are actuated in a pattern determined by the setting of the cams on the table. When the binary number switch configuration agrees with the program switch configuration all of relays R1 through R4 are energized. In practice, the cams which actuate the switches LS1–LS4 are set ahead of the final indexed position which they identify. Since table rotation in this instance is in either direction, it has been found expedient to position these cam rows substantially intermediate adjacent indexed positions so that anticipation in each direction is achieved. At such time as all of the relays R1 through R4 are energized valve actuator E13 is de-energized and valve V13 closes. This inserts creep orifice K5 in series in the hydraulic circuit dropping table motor speed to creep speed.

In indexed position, limit switch LS5 is actuated. This opens the circuit to the coil of actuator D1 and directional valve DV closes cutting off hydraulic fluid to the table motor 30. Thus the table is stopped.

Attention is invited to the fact that the gate circuit 192 of FIG. 10 may be of a character described in FIG. 16, rather than of the type involving diode circuit "and" gates as referred to. Additionally, reference may be made to the fact that the circuit may be altered in different ways to maintain valve V13 de-energized initially if desired, and energized only at such time as all of the relays R1 through R4 are energized. Operation of the circuit may be initiated from a manual control console such as described through operation of a push-button switch PDV having respective contacts in the separate power supply circuits. Here, also, initiation of operation may be part of an automatic sequence such as that controlled by a stepping switch or electronic distributor under the control of a suitable type of numerical program.

What is claimed is:

1. A machine tool, comprising: a support; spindle drive means on said support; a pair of tool spindles; means movably mounting said tool spindles on said support for movement between active and inactive positions relative to said spindle drive means; means for engaging said spindle drive means with that tool spindle in its active position; an indexable tool magazine movably mounted on said support; a tool changer movably mounted on said support; and power means connected to said tool changer for operating said tool changer to interchange tools between said tool magazine and that one of said tool spindles in inactive position.

2. A machine tool, comprising: a workpiece table; a tool carriage assembly movable relative to said table; spindle drive means; a pair of tool spindles; means movably mounting said tool spindles on said tool carriage assembly for movement between active and inactive positions relative to said spindle drive means; means engaging said spindle drive means with that tool spindle that is in its active position; an indexable tool magazine for carrying tools, movably mounted on said tool carriage assembly; a tool changer movably mounted on said tool carriage assembly; and power means connected to and operating said tool changer to interchange tools between said tool magazine and that one of said tool spindles in inactive position.

3. A machine tool, comprising: a workpiece table; a tool carriage assembly movable relative to said table; a pair of spindles; means rotatably mounting said tool spindles assembly on said tool carriage assembly for rotating said spindles between active and inactive positions; an indexable tool magazine for carrying tools, rotatably mounted on said tool carriage assembly; a tool changer movably mounted on said tool carriage assembly; and power means connected to said tool changer for operating said tool changer to interchange tools between said tool magazine and that one of said tool spindles in inactive position.

4. A machine tool, comprising: a main support; spindle drive means on said main support; a pair of tool spindles; a spindle support mounting said spindles for rotation about respective spindle axes disposed at an angle to one another; bearing means mounting said spindle support on said main support for rotation about an axis substantially bisecting the angle between said spindle axes, providing spindle movement between active and inactive positions relative to said spindle drive means; means for engaging said spindle drive means with that spindle which is in its active position; an indexable tool magazne rotatably mounted on said main support and having tool supports for mounting tools in positions in which at least the axis of a tool indexed relative to a spindle in its inactive position substantially parallels the axis of that spindle in its inactive poistion; a tool changer movably mounted on said main support; and power means connected to said tool changer for operating said tool changer to interchange tools between said tool magazine and that one of said tool spindles in inactive position.

5. A machine tool, comprising: a base; a carriage movably mounted on said base for movement along a substantially linear path; spindle drive means on said carriage; a pair of tool spindles; a spindle support mounting said spindles for rotation about respective spindle axes disposed at an angle less than 180° to one another; bearing means mounting said spindle support on said carriage for rotation about an axis substantially bisecting the angle between said spindle axes providing spindle movement between active and inactive positions relative to said spindle drive means; means for engaging said spindle drive means with that spindle which is in its active position; said axis of said spindle support being inclined at an angle to said path of movement of said member positioning that spindle which is in its active position with its axis substantially paralleling said path of movement, the axis of that spindle which is in its inactive position being disposed at an angle to said path; a tool magazine rotatably mounted on said carriage and having supports for mounting tools in positions in which at least the axis of a tool indexed relative to said inactive spindle substantially parallels the axis of the inactive spindle; a tool changer mounted on said carriage; and power means connected to said tool changer for operating said tool changer to interchange tools between said tool magazine and that one of said tool spindles in inactive position.

6. A machine tool, comprising: a base; a carriage movably mounted on said base for movement along a substantially linear path; spindle drive means on said carriage; a pair of tool spindles; a spindle support mounting said spindles for rotation about respective axes disposed at an acute angle to one naother; bearing means mounting said spindle support on said carriage for rotation about an axis substantially bisecting the angle between said spindle axes, providing spindle movement between active and inactive positions relative to said spindle drive means; means for engaging said spindle drive means with that spindle which is in its active position; said axis of said spindle support being inclined at an angle to said path of said carriage positioning that spindle which is in its active position with its axis substantially paralleling said path, the axis of that spindle which is in its inactive position being disposed at an angle to said path of said carriage; a circular tool magazine rotatably mounted on said carriage rearwardly of that spindle which is in its inactive position and having tool supports for mounting tools in circumferentially spaced positions in which at least the axis of a tool indexed adjacent that spindle which is in its inactive position substantially parallels the axis of the inactive spindle; a tool changer mounted on said carriage; and power means connected to said tool changer for operating said tool changer to interchange tools between said magazine and said tool spindle in inactive position.

7. A machine tool, comprising: a support; spindle drive means on said support; a pair of tool spindles; means movably mounting said tool spindles on said support for movement between active and inactive positions relative to said spindle drive means; means for engaging said spindle drive means with that spindle which is in its active position; an indexable tool magazine mounted on said support and having tool receivers for mounting tools in positions in which at least the axis of a tool indexed adjacent that spindle which is in its inactive position substantially parallels the axis of the inactive spindle; a tool changer carriage mounted on said support for movement transversely of an indexed tool in a plane including the axis of that spindle which is in its inactive position and the axis of said indexed tool; a tool changer mounted on said tool changer carriage for movement along a path substantially at right angles to the path of movement of said tool changer carriage; and separate power means connected to said tool changer carriage and to said tool changer.

8. A machine tool, comprising: a main support; spindle drive means on said main support; a pair of tool spindles; a spindle support mounting said spindles for rotation about respective spindle axes disposed at an angle to one another; bearing means mounting said spindle support on said main support for rotation about an axis substantially bisecting the angle between said spindle axes for spindle movement between active and inactive positions relative to said spindle drive means; means for engaging said spindle drive means with that spindle which is in its active position; a tool magazine rotatably mounted on said main support and having tool receivers for mounting tools in positions in which at least the axis of a tool indexed relative to that spindle which is in its inactive position substantially parallels the axis of the inactive spindle; a tool changer carriage mounted on said main support for movement transversely of an indexed tool in a plane including the axis of that spindle which is in its inactive position and the axis of said indexed tool; a tool changer mounted on said tool changer carriage for movement substantially at right angles to the path of movement of said tool changer carriage; power means connected to said tool changer carriage to move said tool changer carriage; and power means connected to said tool changer to move said tool changer.

9. A machine tool comprising: a first member; a second member mounted on said first member and movable along a substantially linear path; spindle drive means on said second member; a pair of tool spindles; a spindle support mounting said spindles for rotation about respective spindle axes disposed at an angle less than 180° to one another; bearing means mounting said spindle support on said second member for rotation about an axis substantially bisecting the angle between said spindle axes, providing spindle movement between active and inactive positions relative to said spindle drive means; means for engaging said spindle drive means with that spindle which is in its active position, said axis of said spindle support being inclined at an angle to said path of movement of said member positioning that spindle which is in its active position with its axis substantially paralleling said path, the axis of that spindle which is in its inactive position being disposed at an angle to said path; a tool magazine rotatably mounted on said second member and having tool receivers for mounting tools in positions in which at least the axis of a tool indexed relative to that spindle which is in its inactive position substantially parallels the axis of the inactive spindle; a tool changer carriage mounted on said second member for movement transversely of an indexed tool in a plane including the axis of that spindle which is in its inactive position and the axis of the indexed tool; a tool changer mounted on said tool changer carriage for movement substantially at right angles to the path of movement of said tool changer carriage; power means connected to said tool changer carriage for moving said tool changer carriage; and power means connected to said tool changer for moving said tool changer.

10. A machine tool, comprising: a first member; a second member movably mounted on said first member and movable along a substantially linear path; spindle drive means on said second member; a pair of tool spindles; a spindle support mounting said spindles for rotation about respective axes disposed at an acute angle to one another; bearing means mounting said spindle support on said second member for rotation about an axis substantially bisecting the angle between said spindle axes providing spindle movement between active and inactive positions relative to said spindle drive means; means for engaging said spindle drive means with that spindle which is in its active position, said axis of said spindle support being inclined at an angle to the path of movement of said member positioning that spindle which is in its active position with its axis substantially paralleling said path of movement, the axis of that spindle which is in its inactive position being at an angle to said path of movement; a circular tool magazine rotatably mounted on said second member rearwardly of that spindle which is in its inactive position and having tool receivers for mounting tools in circumferentially spaced positions in which at least the axis of a tool indexed adjacent that spindle which is in its inactive position substantially parallels the axis of the inactive spindle; a tool changer carriage mounted on said second member for movement transversely of an indexed tool in a plane including the axis of that spindle which is in its inactive position and the axis of the indexed tool; a tool changer mounted on said tool changer carriage for movement substantially at right angles to the path of movement of said tool changer carriage; power means connected to said tool changer carriage for moving said tool changer carriage; and power means connected to said tool changer for moving said tool changer.

11. A machine tool comprising: a first member; a second member movably mounted on said first member; spindle drive means on said second member; a pair of tool spindles; means movably mounting said tool spindles on said second member for movement between active and inactive positions relative to said spindle drive means; means for engaging said spindle drive means with that spindle which is in its active position; an indexable tool magazine movably mounted on said second member; a tool clamp in each tool spindle and operable between tool clamping and tool releasing positions; a movable tool clamp actuator disposed on said second member for engaging and releasing the tool clamp in that tool spindle which is in its inactive position; power means connected to and operating said tool clamp actuator; a tool changer movably mounted on said second member; and power means connected to said tool changer for operating said tool changer to interchange tools between said tool magazine and that one of said tool spindles in inactive position.

12. A machine tool comprising: a first member; a second member movably mounted on said first member; spindle drive means on said second member; a pair of tool spindles; means movably mounting said tool spindles on said second member for movement between active and inactive positions relative to said spindle drive means; means for engaging said spindle drive means with that spindle which is in its active position; an indexable tool magazine movably mounted on said second member; a tool clamp in each tool spindle and operable between tool clamping and tool releasing positions; mean disposed on said second member adjacent the inactive tool spindle and having a movable member for engaging and releasing the tool clamp therein; a tool changer movable mounted on said one member; and power means connected to said tool changer for operating said tool changer to interchange tools between said tool magazine and that one of said tool spindles in inactive position.

13. A machine tool, comprising:
a support;
spindle drive means on said support;
a pair of tool spindles;
means movably mounting said tool spindles on said support for movement between an active position relative to said spindle drive means and a tool exchanging position;
means for engaging said spindle drive means with that tool spindle in its active position;
and means including a member adapted to hold a plurality of tools, for selecting and interchanging a selected tool with that one of said tool spindles in tool exchanging position.

14. A machine tool, comprising:
a support;
spindle drive means on said support;
a pair of tool spindles;
means movably mounting said tool spindles on said support for movement between an active position relative to said spindle drive means and a tool exchanging position;
means for engaging said spindle drive means with that tool spindle in its active position;
and means including a member adapted to hold a plurality of tools, for selecting and interchanging a selected tool with that one of said tool spindles in tool exchanging position.

15. A machine tool, comprising:
a work station;
a support;
a pair of tool holders, each adapted to receive and hold a tool;
means movably mounting said tool holders on said support for movement between a working position at said work station and a tool exchanging position;
and means including a member adapted to hold a plurality of tools, for selecting and interchanging a selected tool with that one of said pair of tool holders in tool exchanging position.

16. A machine tool, comprising:
a main support;
spindle drive means on said main support;
a pair of tool spindles;
a spindle support mounting said spindles for rotation about respective spindle axes disposed at an angle to one another;
bearing means mounting said spindle support on said main support for rotation about an axis substantially bisecting the angle between said spindle axes, providing spindle movement between an active position relative to said spindle drive means and a tool exchanging position;
means for engaging said spindle drive means with that spindle which is in its active position;
and means movably mounted on said main support, including a member adapted to carry a plurality of tools, for selecting a tool and interchanging a selected tool with that one of said pair of tool spindles in tool exchanging position.

17. In a machine tool, the combination comprising:
a main support;
spindle drive means on said main support;
a pair of tool spindles;
a spindle support mounting said spindles for rotation about respective spindles axes disposed at an angle to one another;
means mounting said spindle support on said main support for rotation about an axis substantially bisecting the angle between said spindle axes, providing spindle movement between an active position relative to said spindle drive means and a tool exchanging position;
a tool magazine rotatably mounted on said main support for rotation about an axis disposed at an acute angle relative to the axis of rotation of that one of said pair of tool spindles in tool exchanging position and having circumferentially distributed tool receiving slots, the longitudinal axes of which are disposed at substantially the same angle as said acute angle relative to said axis of rotation of said tool magazine, each tool slot being additionally disposed at a radial position on said tool magazine so that a tool indexed by said tool magazine in tool exchanging position relative to said spindle has its tool axis disposed substantially parallel to and laterally displaced from said axis of said spindle in tool exchanging position;
and tool changer means movably mounted on said support for transferring a tool in tool exchanging position in said tool magazine to said tool spindle.

18. A machine tool, comprising:
a work station for receiving workpieces;
support means;
a pair of tool holders;
means movably mounting said tool holders on said support means for movement between an operative position with respect to said work station and a tool exchanging position removed from said work station;
an indexable tool magazine movably connected to said support means;
a tool changer movably connected to said support means;
and power means connected to said tool changer for operating said tool changer to interchange tools between said tool magazine and that one of said tool holders in tool exchanging position.

19. A machine tool, comprising:
a work station for receiving workpieces;
a support;
a frame movably mounting said support adjacent said work station;
a pair of tool holders;
means movably mounting said tool holders on said support for movement between an operative position with respect to said work station and a tool exchanging position removed from said work station;
tool selection means including a tool storage member movably mounted on said support for moving a selected tool to a position adjacent said tool holder in tool exchanging position;
a tool changer movably mounted on said support;
and power means connected to said tool changer for operating said tool changer to remove said selected tool from said tool storage member and place said selected tool in said tool holder in tool exchanging position.

20. A machine tool, comprising:
a work station;
a support movably disposed adjacent said work station;
a pair of tool holders;
means movably mounting said tool holders on said support for alternate movement beween a position adjacent said work station and a tool exchanging position removed from said work station;
means for moving said support with respect to said work station;
and means supported by said support including a tool storage member adapted to hold a plurality of tools, for selecting and interchanging selected tools between said tool storage member and that one of said tool holders in tool exchanging position whether or not said support is moving.

References Cited by the Examiner

UNITED STATES PATENTS

| | | | |
|---|---|---|---|
| Re. 25,583 | 5/1964 | Brainard | 29—568 |
| 2,901,927 | 9/1959 | Morgan | 29—568 X |
| 3,073,024 | 1/1963 | Hutchens | 29—568 |
| 3,133,349 | 5/1964 | Riedel | 29—568 |
| 3,136,563 | 6/1964 | Swanson | 29—568 |

FOREIGN PATENTS 946,987  1/1964  Great Britain.

RICHARD H. EANES, JR., *Primary Examiner.*